United States Patent
Kawamura et al.

(10) Patent No.: US 6,535,688 B1
(45) Date of Patent: *Mar. 18, 2003

(54) APPARATUS AND METHODS FOR MULTIPLEXING, RECORDING AND CONTROLLING THE DISPLAY OF IMAGE DATA, AND RECORDING MEDIUM THEREFOR

(75) Inventors: Makoto Kawamura, Kanagawa (JP); Yasushi Fujinami, Kanagawa (JP); Yoichi Yagasaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/692,276

(22) Filed: Aug. 1, 1996

(30) Foreign Application Priority Data

Aug. 4, 1995 (JP) ............................................. 7-200082

(51) Int. Cl.[7] ............................. H04N 7/06; H04N 7/08; H04N 5/91

(52) U.S. Cl. ........................... 386/95; 386/98; 386/123

(58) Field of Search ........................... 386/95, 109, 111, 386/112, 46, 123, 27, 33, 37, 98; 348/445, 556, 558, 913, 222, 239

(56) References Cited

U.S. PATENT DOCUMENTS

| | | | | |
|---|---|---|---|---|
| 5,140,437 A | * | 8/1992 | Yonemitsu et al. | 386/111 |
| 5,298,995 A | * | 3/1994 | Monta et al. | 348/458 |
| 5,444,492 A | * | 8/1995 | Kihara | 348/445 |
| 5,594,552 A | * | 1/1997 | Fujinami et al. | 386/131 |
| 5,835,671 A | * | 11/1998 | Kitamura et al. | 386/97 |

* cited by examiner

Primary Examiner—Robert Chevalier
(74) Attorney, Agent, or Firm—Frommer Lawrence & Haug LLP; William S. Frommer; Dennis M. Smid

(57) ABSTRACT

Digital image data which has been compressed in accordance with the MPEG system and corrected for aspect ratio is multiplexed with correction data provided as PSM data for correcting the aspect ratio of such digital image data in the letterbox mode, squeeze mode or the like. The PSM data is detected from the bit stream by a PSM detector and a control signal is generated in response to the detected PSM data for controlling filters of a display so that the latter displays an image in the correct state.

30 Claims, 39 Drawing Sheets

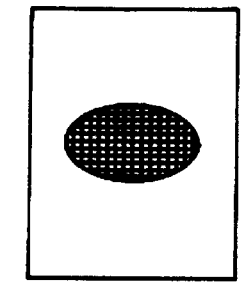
FIG. 1E
(PRIOR ART)
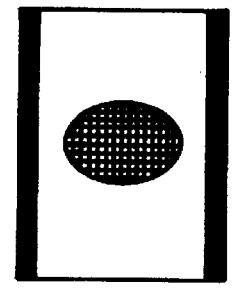
FIG. 1F
(PRIOR ART)
FIG. 1G
(PRIOR ART)
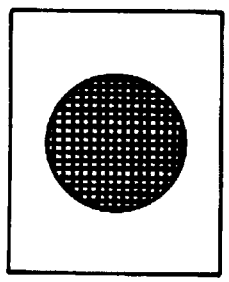
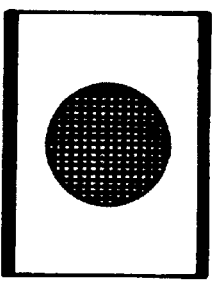
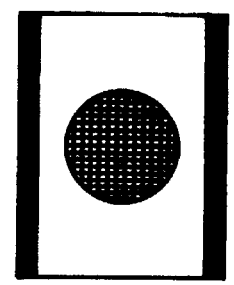
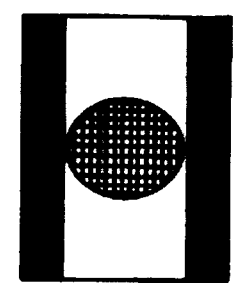
FIG. 1A 4:3
(PRIOR ART)
FIG. 1B 14:9
(PRIOR ART)
FIG. 1C 16:9
(PRIOR ART)
FIG. 1D Cinema scope (approx 2:1)
(PRIOR ART)

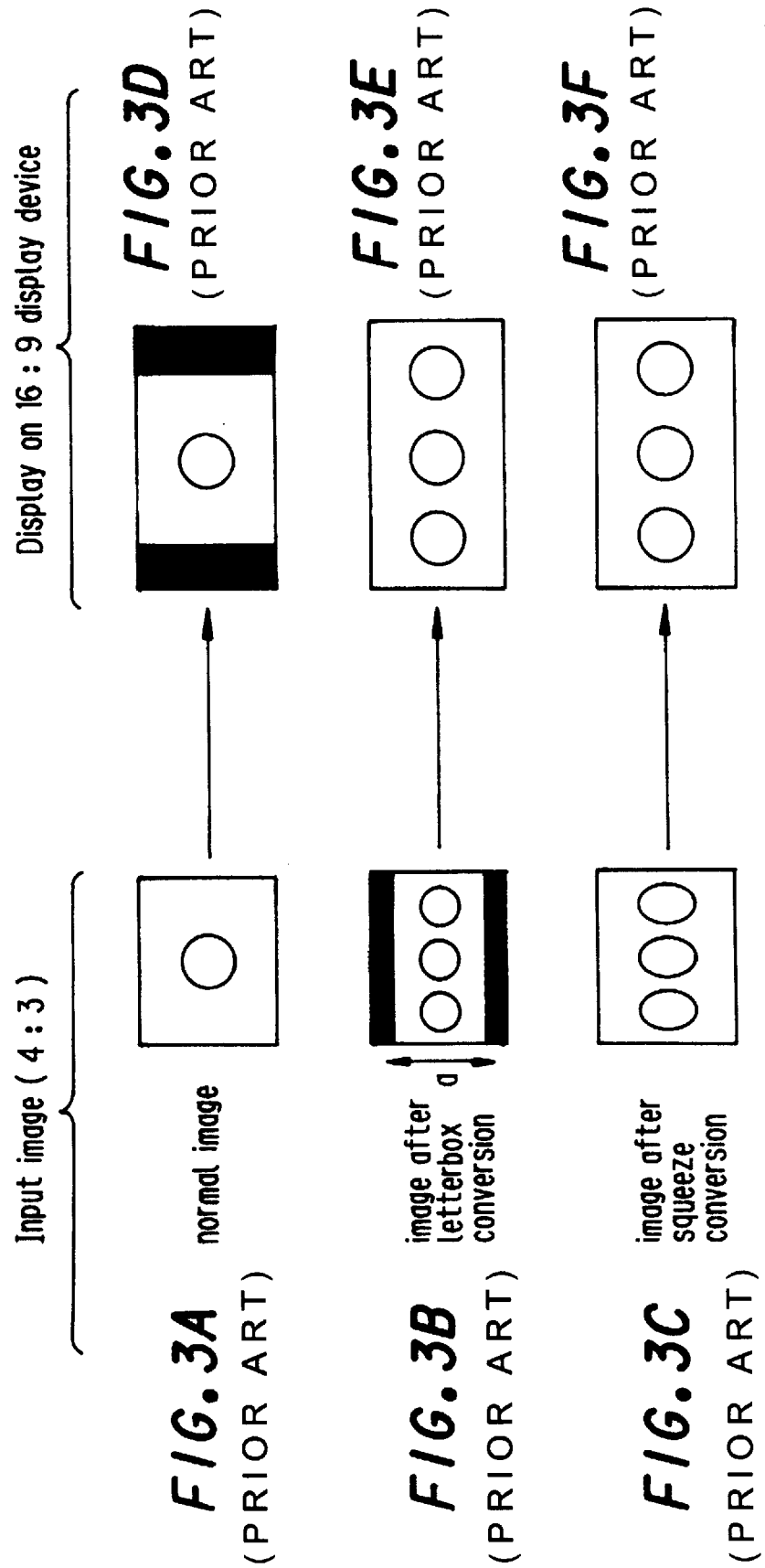

| | bit No. | "1" | "0" | Content |
|---|---|---|---|---|
| WORD 0-A | 1 | Full mode (16:9) | 4:3 | Transmission aspect ratio |
| | 2 | Letterbox | Normal | Image display format |
| | 3 | | | |

FIG. 11

| b₃ | b₂b₁b₀ | Aspect ratio label | Full format or Letterbox | Position | No. of active lines (NOTE1) |
|---|---|---|---|---|---|
| 1 | 000 | 4:3 | full format (normal) | not applicable | 576 |
| 0 | 001 | 14:9 | letterbox | center | 504 |
| 0 | 010 | 14:9 | letterbox | top | 504 |
| 1 | 011 | 16:9 | letterbox | center | 430 |
| 0 | 100 | 16:9 | letterbox | top | 430 |
| 1 | 101 | >16:9 | letterbox | center | not defined |
| 1 | 110 | 14:9 | full format (NOTE2) | center | 576 |
| 0 | 111 | 16:9 | full format (anamorphic) | not applicable | 576 |

NOTE1: The number of active lines is only an indication for the exact aspect ratio $a = 1.33$, $a = 1.57$, and $a = 1.73$ NOTE2: The actual transmitted aspect ratio is 4:3, but a 14:9 window should contain all the relevant picture content to encourage a wide screen display on a 16:9 television set.

FIG. 13

| Aspect ratio label | Aspect ratio range |
|---|---|
| 4 : 3 | $a \leq 1.46$ |
| 14 : 9 | $1.46 < a \leq 1.66$ |
| 16 : 9 | $1.66 < a \leq 1.90$ |
| >16 : 9 | $a > 1.90$ |

FIG. 14

| $b_4$ | Film bit |
|---|---|
| 0 | camera mode |
| 1 | film mode (NOTE) |
| NOTE : | The field dominance shall conform to the ESU Recommendation R62[1] |

FIG. 15

| $b_8$ | Subtitles within teletext bit |
|---|---|
| 0 | no subtitles within teletext |
| 1 | subtitles within teletext |

FIG. 16

| $b_9, b_{10}$ | subtitles in/out of active image area |
|---|---|
| 0 0 | no open subtitles |
| 1 0 | subtitles in active image area |
| 0 1 | subtitles out of active image area |
| 1 1 | reserved |
| NOTE : | The "out of active image area" subtitling, which extends into the active image area shall be treated as "out of active image area" |

| | bit No. | "1" | "0" | Content |
|---|---|---|---|---|
| WORD 0 | 1 | Full (squeese) mode (16 : 9) | 4 : 3 | Transmission aspect ratio |
| | 2 | Letterbox | Normal | Image display format |

FIG. 19

| bit No.<br>3 4 5 6 | Content transmitted in WORD2 | Data format |
|---|---|---|
| 0 0 0 0 | Digital copy data | CGMS-A (Figs.20-21) |
| 0 0 0 1 | Image format data | Flag (Figs.22-24) |
| 0 0 1 0 | Subtitle position data | (Figs.25-27) |
| 0 0 1 1 | To be defined | |
| 0 1 0 0 | To be defined | |
| 0 1 0 1 | To be defined | |
| 0 1 1 0 | To be defined | |
| 0 1 1 1 | To be defined | |
| 1 0 0 0 | To be defined | |
| 1 0 0 1 | To be defined | |
| 1 0 1 0 | To be defined | |
| 1 0 1 1 | To be defined | |
| 1 1 0 0 | To be defined | |
| 1 1 0 1 | To be defined | |
| 1 1 1 0 | To be defined | |
| 1 1 1 1 | To be defined | |

(WORD 1)

FIG. 20

| bit No. | "1" | "0" | Comments |
|---|---|---|---|
| WORD 2 — 7 | FIG. 21 (CGMS-A)" | | Copy-Possible Generation |
| 8 | | | |
| 9 | | | To be Defined |
| 10 | | | To be Defined |
| 11 | | | To be Defined |
| 12 | | | To be Defined |
| 13 | | | To be Defined |
| 14 | | | To be Defined |

FIG. 21

| bit 7 | bit 8 | Copy-Possible Generation |
|---|---|---|
| 0 | 0 | Copy Free |
| 0 | 1 | Reserved |
| 1 | 0 | 1 generation |
| 1 | 1 | No more generation |

FIG.22

| bit No. | "1" | "0" | Flag content |
|---|---|---|---|
| WORD 2 — 7 | FIG.23 | | Screen size |
| 8 | | | |
| 9 | FIG.24 | | Screen position |
| 10 | | | |
| 11 | present | absent | Subtitles not in image part |
| 12 | | | To be defined |
| 13 | | | To be defined |
| 14 | | | To be defined |

FIG.23

| bit 7 | bit 8 | Screen size |
|---|---|---|
| 0 | 0 | 4 : 3 |
| 0 | 1 | 14 : 9 Letter box |
| 1 | 0 | 16 : 9 Letter box |
| 1 | 1 | Cinemascope letter box |

FIG.24

| bit 9 | bit 10 | Screen position |
|---|---|---|
| 0 | 0 | Center |
| 0 | 1 | Above |
| 1 | 0 | Below |
| 1 | 1 | Not used |

FIG.25

| WORD 1<br>bit 3 4 5 6 | bit 14<br>MSB | WORD 2 | bit 7<br>LSB |
|---|---|---|---|
| | | | vertical |
| 0 0 1 0 | | Subtitle position (FIG.26) | |

FIG.26

| bit No. | "1" | "0" | Flag content |
|---|---|---|---|
| 7 | Top end | Bottom end | Subtitle position shown in bit 8~14 |

FIG.27

| Line value of subtitle end | 0 | 1 | 2 | 3 | - - - | 125 | 126 | 127 | |
|---|---|---|---|---|---|---|---|---|---|
| Top end | 22 | 23 | 24 | 25 | - - - | 147 | 148 | 149 | Line |
| Bottom end | 262 | 261 | 260 | 259 | - - - | 137 | 136 | 135 | Line |

FIG.28

| Character | b6 | b5 | b4 | b3 | b2 | b1 | b0 |
|---|---|---|---|---|---|---|---|
| Start | 1 | S5 | S4 | S3 | S2 | S1 | S0 |
| End | 1 | E5 | E4 | E3 | E2 | E1 | E0 |
| Other | 1 | – | – | – | – | – | Q0 |
| Null | 0 | 0 | 0 | 0 | 0 | 0 | 0 |

{ Q0=1 Squeeze
  Q0=0 Normal bottom line number of subtitle top line number of subtitle bottom line number of subtitle

FIG. 35

| Syntax | No. of Bits | Mnemonic |
|---|---|---|
| PSM() { | | |
|   packet_start_code_prefix | 24 | bslbf |
|   map_stream_id | 8 | uimsbf |
|   program_stream_map_length | 16 | uimsbf |
|   current_next_indicator | 1 | bslbf |
|   reserved | 2 | bslbf |
|   program_stream_map_version | 5 | uimsbf |
|   reserved | 7 | bslbf |
|   marker_bit | 1 | bslbf |
|   program_stream_info_length | 16 | uimsbf |
|   global_descriptors() | | |
|   elementary_stream_map_length | 16 | uimsbf |
|   for (all elementary_streams) { | | |
|     stream_type | 8 | uimsbf |
|     elementary_stream_id | 8 | uimsbf |
|     elementary_stream_info_length | 16 | uimsbf |
|     if(stream_id==private_data_1 \|\| | | |
|       stream_id==private_data_2) { | | |
|       DVD_private_stream_descriptor() | | |
|     } | | |
|     elementary_stream_descriptors() | | |
|   } | | |
|   CRC_32 | 32 | rpchof |
| } | | |

FIG.36

| Syntax | No. of Bits | Mnemonic |
|---|---|---|
| Global Descriptors() {<br>  for(p=0;P<max_number_of_paths;p++)<br>    path_descriptors()<br>  program_descriptors()<br>  if(<this optional descriptor is included>>)<br>    stream_grouping descriptor()<br>  if(<this optional descriptor is included>>)<br>    copy_control descriptor()<br>  if(<this optional descriptor is included>>)<br>    copyright_descriptor()<br>  if(<this optional descriptor is included>>)<br>    for(i=0;i<num_padding_descriptors;i++)<br>      padding_descriptor()<br>  if(<non_DVD descriptors are included>>)<br>    descriptors()<br>} | | |

FIG. 37

| Syntax | No. of Bits | Mnemonic |
|---|---|---|
| elementary_stream descriptors() { | | |
|   if(<referenced elementary stream-type is video>) { | | |
|     dvd_video_descriptor() | | |
|     ip_ipp_descriptor() | | |
|   } | | |
|   if(<referenced elementary stream-type is audio>) { | | |
|     dvd_audio_descriptor() | | |
|     ISO_639_language_descriptor() | | |
|   } | | |
|   if(<referenced elementary stream-type is lpcm>) { | | |
|     dvd_lpm_descriptor() | | |
|     ISO_639_language_descriptor() | | |
|   } | | |
|   if(<referenced elementary stream-type is subtitle>) { | | |
|     dvd_subtitle_descriptor() | | |
|     ISO_639_language_descriptor() | | |
|   } | | |
|   if(<this optional descriptor is included>) | | |
|     copyright_descriptor() | | |
|   if(<this optional descriptor is included>) | | |
|     for(i=0;i<num_padding_descriptors;i++) | | |
|       padding_descriptor() | | |
|   if(<non-DVD descriptors are included>) | | |
|     descriptors() | | |
| } | | |

FIG.38

| Descriptor | Type | Tag |
|---|---|---|
| path_descriptor () | DVD defined | 0x10 |
| program_descriptor () | DVD defined | 0xef |
| stream_grouping_descriptor () | DVD defined | 0xed |
| copy_control_descriptor () | DVD defined | 0xec |
| padding_descriptor () | DVD defined | 0xeb |
| layer_jump_descriptor () | Not yet defined | 0xea |
| dvd_private_stream_descriptor () | DVD defined | 0xe9 |
| dvd_video_descriptor () | DVD defined | 0xdf |
| dvd_audio_descriptor () | DVD defined | 0xdd |
| dvd_subtitle_descriptor () | DVD defined | 0xdc |
| dvd_lpcm_descriptor () | DVD defined | 0xdb |
| ISO_639_Language_descriptor () | MPEG defined | 0x0a |
| ip_ipp_descriptor () | DVD defined | 0xda |
| copyright_descriptor () | MPEG defined | 0x0d |
| video_special_coding_descriptor () | Not yet defined | 0xd8 |

FIG. 39

```
dvd_video_descriptor () {
        descriptor_tag                          8       uimsbf
        descriptor_length                       8       uimsbf
        horizontal_size                         16      uimsbf
        vertical_size                           16      uimsbf
        display_horizontal_size                 16      uimsbf
        display_vertical_size                   16      uimsbf
        reserved                                10      bslbf
        film_or_camera_flag                     1       bslbf
        closed_gop_flag                         1       bslbf
        still_picture_flag                      1       bslbf
        reserved                                1       bslbf
        edge_crop_flag                          1       bslbf
        aspect_ratio_code                       4       bslbf
        frame_rate_code                         4       bslbf
        reserved                                8       bslbf
        wss_aspect_ratio_code                   4       bslbf
        wss_subtitles_within_teletext_flag      1       bslbf
        wss_subtitling_mode                     2       bslbf
        reserved                                1       bslbf
        cgms_a_code                             2       bslbf
        ext1204_screen_size_code                2       bslbf
        ext1204_screen_position_code            2       bslbf
        reserved                                3       bslbf
        ext1204_subtitle_position_upper         7       uimsbf
        reserved                                1       bslbf
        ext1204_subtitle_position_lower         7       uimsbf
```

FIG.40

| aspect_ratio_code | definition |
|---|---|
| 0000 | (forbidden) |
| 0001 | pixel aspect ratio = 1 : 1 |
| 0010 | display aspect ratio = 4 : 3 |
| 0011 | display aspect ratio = 16 : 9 |
| 0100 | display aspect ratio = 2.21 : |
| 0101 ∫ 1111 | (reserved) |

FIG.41

| frame_rate_code | frame_rate_value |
|---|---|
| 0000 | forbidden |
| 0001 | 23.976 |
| 0010 | 24 |
| 0011 | 25 |
| 0100 | 29.97 |
| 0101 | 30 |
| 0110 | 50 |
| 0111 | 59.94 |
| 1000 | 60 |
| .... | reserved |
| 1111 | reserved |

FIG.42

```
video_sequence() {
        next_start_code()
        sequence_header()
        if( nextbits() == extension_start_code ) {
                sequence_extension()
                do {
                        extension_and_user_data(0)
                        do {
                                if( nextbits() == group_start_code ) {
                                        group_of_pictures_header()
                                        extension_and_user_data(1)
                                }
                                picture_header()
                                picture_coding_extension()
                                extensions_and_user_data(2)
                                picture_data()
                        } while (( nextbits() == picture_start_code ) ||
                                ( nextbits() == group_start_code ))
                        if( nextbits() != sequence_end_code ) {
                                sequence_header()
                                sequence_extension()
                        }
                } while (( nextbits() != sequence_end_code )
        } else {
                /*ISO/IEC 11172-2 : MPEG1*/
        }
        sequence_end_code
}
```

FIG.43

```
user_data() {
        user_data_start_code
        while ( nextbits() != "0000 0000 0000 0000 0000 0001" ) {
                user_data          (8bit)
        }
        next_start_code ()
}
```

FIG. 44

```
user_data() {
    user_data_start_code
    while ( nextbits() != "0000 0000 0000 0000 0000 0001" ) {
            descriptor_tag                          8    uimsbf
            descriptor_length                       8    uimsbf
            marker_bit(s)                           8    bslbf
            horizontal_size                        16    uimsbf
            marker_bit(s)                           8    bslbf
            vertical_size                          16    uimsbf
            marker_bit(s)                           8    bslbf
            display_horizontal_size                16    uimsbf
            maker bit(s)                            8    bslbf
            display_vertical_size                  16    uimsbf
            marker_bit                              1    bslbf
            reserved                                9    bslbf
            film_or_camera_flag                     1    bslbf
            closed_gop_flag                         1    bslbf
            still_picture_flag                      1    bslbf
            reserved                                1    bslbf
            edge_crop_flag                          1    bslbf
            aspect_ratio_code                       4    bslbf
            frame_rate_code                         4    bslbf
            marker_bit                              1    bslbf
            reserved                                7    bslbf
            wss_aspect_ratio_code                   4    bslbf
            wss_subtitles_within_teletext_flag      1    bslbf
            wss_subtitlilg_mode                     2    bslbf
            marker_bit                              1    bslbf
            cgms_a_code                             2    bslbf
            ext1204_screen_size_code                2    bslbf
            ext1204_screen_position_code            2    bslbf
            reserved                                3    bslbf
            ext1204_subtitle_position_upper         7    uimsbf
            marker_bit                              1
            ext1204_subtitle_position_lower         7    uimsbf
    }
    next_start_code()
}
```

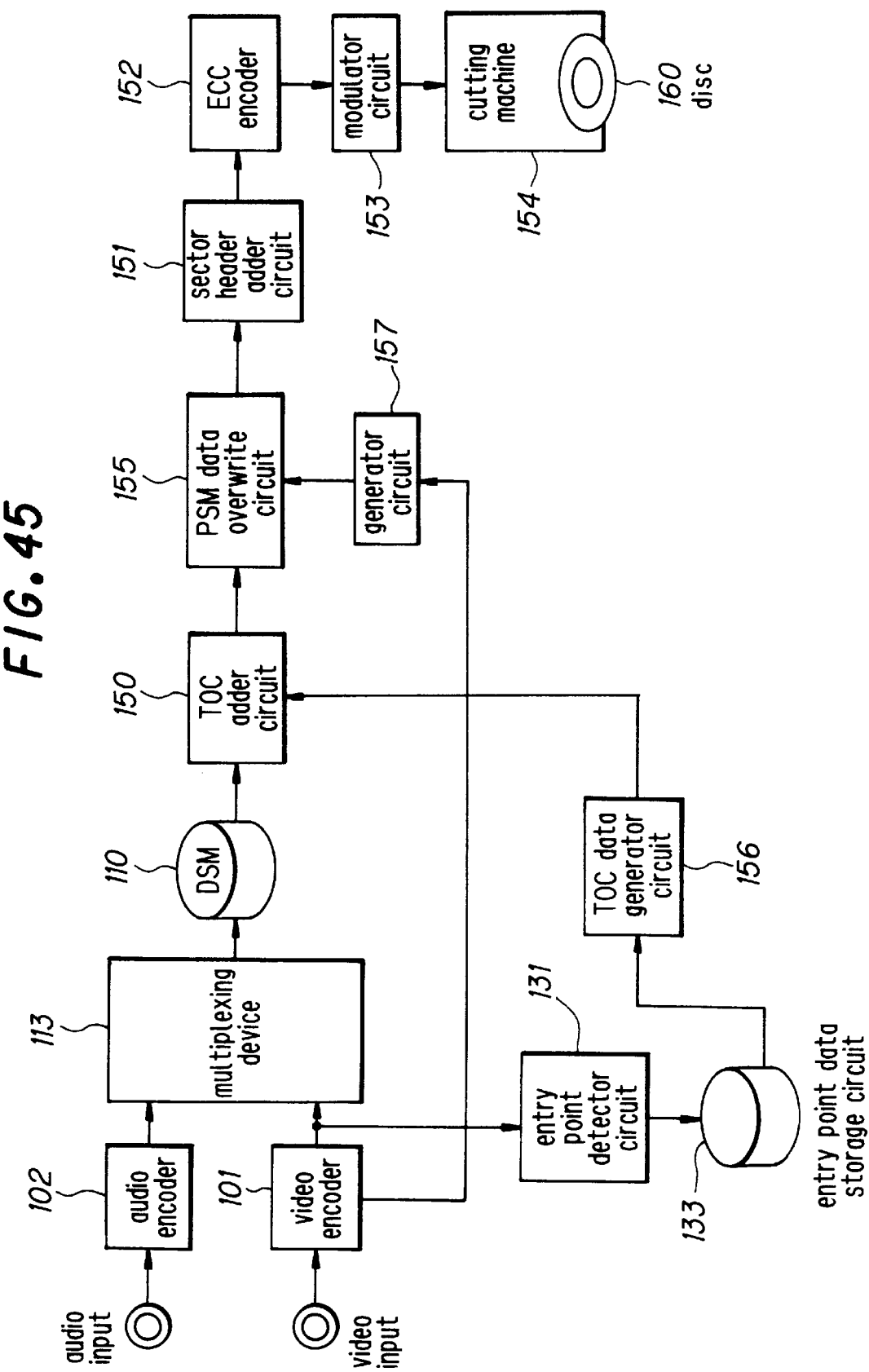

APPARATUS AND METHODS FOR MULTIPLEXING, RECORDING AND CONTROLLING THE DISPLAY OF IMAGE DATA, AND RECORDING MEDIUM THEREFOR

BACKGROUND OF THE INVENTION

This invention relates generally to image data multiplexing, recording and display control apparatus and methods and an image data recording medium, and more particularly is directed to such apparatus, methods and a recording medium arranged so as to be able to display at correct aspect ratio image data produced, recorded and transmitted with different aspect ratios.

Television is broadcast in Japan, the United States and elsewhere using the so-called NTSC standard, for which an aspect ratio of 4:3 is established. For this reason, conventional display equipment, such as television receivers and monitors, mostly have their aspect ratios fixed at 4:3. However, with the recent increase in high quality or definition television broadcasts, typified by HiVision, which employ an aspect ratio of 16:9, television receivers with the wider aspect ratio of 16:9, the so-called wide screen televisions, are becoming increasingly popular.

As a result, the image sources that are produced and broadcast are also tending to have the wider 16:9 or other aspect ratios.

Image data for display on a screen having this 16:9 or other wider aspect ratio may undergo a change or correction of the aspect ratio prior to transmission, so that it can be shown on displays with a 4:3 aspect ratio.

For example, FIG. 1A shows a screen with a 4:3 aspect ratio. Image data intended for display on this screen is transmitted without alteration and, of course, can be displayed as received. However, in comparison, image data for a screen with a 14:9 aspect ratio is transmitted in the so-called letterbox mode, as shown in FIG. 1B, that is, is transmitted after dark or non-image portions are added above and below the active image region to provide an overall aspect ratio of 4:3. Alternatively, image data for a screen with a 14:9 aspect ratio may be compressed in the horizontal direction of the screen in the so-called squeeze mode, as shown in FIG. 1E, whereby it is converted to image data for a 4:3 aspect ratio screen before being transmitted.

Moreover, image data for a screen with a 16:9 aspect ratio may be transmitted in the letterbox mode, as shown in FIG. 1C, that is, after dark or non-image portions are added above and below the active image region having the aspect ratio of 16:9 to provide an overall aspect ratio of 4:3 for broadcast. The dark portions in this case are wider than in the case of the image data for a screen of 14:9 aspect ratio as in FIG. 1B.

Alternatively, image data for a screen with a 16:9 aspect ratio can be transmitted in the squeeze mode whereby the image is compressed in the horizontal direction so as to become a 4:3 aspect ratio screen, as shown in FIG. 1F.

Image data for a CinemaScope screen with approximately a 2:1 aspect ratio may be transmitted in the letterbox mode, as shown in FIG. 1D, with even wider dark or non-image portions added above and below the active image region than is the case for the screen shown in FIG. 1C with a 16:9 aspect ratio, before being transmitted so that the received signal can be displayed on a screen with an aspect ratio of 4:3.

Furthermore, image data for a CinemaScope screen with an approximately 2:1 aspect ratio, even if compressed in a squeeze mode in the horizontal direction with a compression ratio converting it from 2:1 to 4:3, has additional dark portions added above and below the active image region after the compression in the horizontal direction since it cannot otherwise be fitted to the 4:3 aspect ratio of the screen on which it is to be displayed, as shown in FIG. 1G. The images shown in FIGS. 1A–1G, respectively, can be received and displayed without further adjustment on displays having a 4:3 aspect ratio. on the other hand, a display or television receiver or monitor 80 with a screen having a 16:9 aspect ratio may be comprised as shown in FIG. 2. Video signals input via an antenna, cable or the like, after demodulation in a TV signal demodulator circuit 81, are output for display to a CRT 85 having a 16:9 aspect ratio through a controllable horizontal filter 82 and a controllable vertical filter 83. In accordance with instructions from the viewer provided by means of a remote controller or the like (not shown), a controller 84 is made to suitably operate horizontal filter 82 or vertical filter 83.

More specifically, as shown in FIG. 3A, for example, when received images with a standard 4:3 aspect ratio (normal images) are demodulated and output from television signal demodulator circuit 81, the viewer uses the remote control to switch on horizontal filter 82 and to switch off vertical filter 83. By this means, on CRT 85 having a 16:9 aspect ratio, as shown in FIG. 3D, dark or non-image portions are added to the display at the left and right-hand sides of the active, image region having a 4:3 aspect ratio.

When data transmitted in the letterbox mode with the overall aspect ratio of 4:3, as shown in FIG. 3B, is provided as the video input in FIG. 2, the viewer uses the remote control to switch off horizontal filter 82 and switch on vertical filter 83. At this time, vertical filter 83 performs a process whereby it removes the dark portions added above and below the active image region and selects only the active image region having, for example, the original aspect ratio of 16:9. By this means, image data having a 16:9 aspect ratio can be normally displayed on CRT 85 as shown in FIG. 3E.

On the other hand, as shown in FIG. 3C, where images processed in the squeeze mode are transmitted with the 4:3 aspect ratio, the viewer uses the remote control to switch off both horizontal filter 82 and vertical filter 83. As a result, an active image region with a 16:9 aspect ratio is normally displayed on CRT 85, as shown in FIG. 3F.

The manual switching of horizontal filter 82 and vertical filter 83 in this way is relatively inefficient. Therefore, there are some television sets where, for example, correction data corresponding to the corrections, if any, to be made in the aspect ratio are transmitted during the vertical blanking interval of the television signal being transmitted, and such correction data are separated out in television signal demodulation circuit 81 and output to controller 84 for automatically controlling filters 82 and 83, as required.

In such case, controller 84 controls horizontal filter 82 and vertical filter 83 not only in response to user instructions from the remote controller but also in response to signals from television signal demodulator circuit 81. In this way, the viewer no longer needs to always effect manual control, and the efficiency of the operation is improved.

However, the insertion of this kind of correction data into a specific line during the vertical blanking interval cannot be employed where the image transmitted or recorded has been digitized. In other words, where a video signal is digitized for transmission, since data in the vertical blanking interval are in effect mostly useless, the specification for such digitizing stipulates that data in the vertical blanking interval are not transmitted or recorded. As a result, even if correction data is inserted within the vertical blanking interval, this correction data is eliminated prior to transmission or recording if the data is digitized.

Furthermore, there are three potential variations for insertion of the dark or non-image portions in the letterbox mode, particularly in respect to the positions thereof relative to the active image region. For example as shown in FIG. 4A, the active image region may be positioned in the middle, that is, vertically centered between two dark portions; at the top, that is, above a single dark-portion, as on FIG. 4B; or at the bottom, that is, below a single dark-portion, as in FIG. 4C.

Moreover, screens may be provided with subtitles, logos, symbols and the like, at various locations in respect to the active image region in the letterbox mode shown in FIG. 5A. For example, subtitling (ABC) may be overlayed and positioned in the active image region as shown in FIG. 5B, or the subtitling may be positioned in one or the other of the dark portions, as shown in FIG. 5C. Moreover, as shown in FIG. 5D, there may be multiple superimposed displays in the dark portions in the form of not only subtitles, but also logos, symbols, marks and other types of patterns.

Since the data for indicating the various display positions of the active image region, as in FIGS. 4A–4C, and for indicating the display positions of subtitles, logos, symbols and the like, are arranged to be transmitted in analog broadcasts by insertion in a specified line in the vertical blanking interval, this data also cannot be used when the image data is transmitted or recorded in digital format in which case, in the course of compression, the data in the vertical blanking intervals are eliminated.

OBJECTS AND SUMMARY OF THE INVENTION

Accordingly, it is generally an object of the present invention to avoid the previously mentioned disadvantages of the prior art.

More particularly, it is an object of the present invention to permit a video signal transmitted or recorded and reproduced in one aspect ratio to be automatically corrected for display by a television receiver or monitor having a screen with a different aspect ratio even when the video signal is transmitted and/or recorded in digital format.

In accordance with an aspect of the invention, an image data multiplexing device comprises means which supplies digital image data which has been compressed and corrected for aspect ratio, for example, as in the letterbox or squeeze mode, means for generating correction data for further correcting the aspect ratio of the digital image data, and means for multiplexing the digital image data and the correction data from said means for generating.

According to another aspect of the invention, an image data multiplexing method comprises the steps of supplying digital image data which has been compressed and corrected for aspect ratio, as in the letterbox or squeeze mode, generating correction data for further correcting the aspect ratio of the digital image data, and multiplexing the digital image data and the correction data.

According to another aspect of the invention, an image data recording device comprises means which supplies digital image data which has been compressed and corrected for aspect ratio, as in the letterbox or squeeze mode, means for generating correction data for further correcting the aspect ratio of the digital image data, means for multiplexing the digital image data and the correction data from the means for generating, and means for recording on a recording medium the data multiplexed by the means for multiplexing.

In accordance with still another aspect of the invention, an image data recording method comprises the steps of supplying digital image data which has been compressed and corrected for aspect ratio, as in the letterbox or squeeze mode, generating correction data for further correcting the aspect ratio of the digital image data, multiplexing the digital image data and the correction data, and recording the multiplexed data on a recording medium.

In accordance with still another aspect of the invention, an image display control device comprises means for separating digital image data and correction data from multiplexed data containing digital image data which has been compressed and corrected for aspect ratio, as in the letterbox or squeeze mode, and correction data for further correcting the aspect ratio of the digital image data, and means for controlling further correction of the aspect ratio of the separated image corresponding to the separated digital image data according to the separated correction data.

In accordance with a further aspect of the invention, an image display control method comprises the steps of separating digital image data and correction data from multiplexed data containing digital image data which has been compressed and corrected for aspect ratio, as in the letterbox or squeeze mode, and correction data for further correcting the aspect ratio of the digital image data, and controlling the correction of the aspect ratio of the image corresponding to the digital image data according to the separated correction data.

In accordance with a still further aspect of the invention, an image display control device comprises means for separating digital image data and correction data from multiplexed data containing digital image data which has been compressed and corrected for aspect ratio, as in the letterbox or squeeze mode, and correction data for further correcting the aspect ratio of the digital image data, and means for generating a correction signal indicating the correction state of the aspect ratio of the image corresponding to the digital image data according to the separated correction data and for superimposing said correction signal on the signal corresponding to the separated digital image data.

In accordance with yet another aspect of the invention, an image display control method comprises the steps of separating digital image data and correction data from multiplexed data containing digital image data which has been compressed and corrected for aspect ratio, as in the letterbox or squeeze mode, and correction data for correction of the aspect ratio of the digital image data, generating a correction signal indicating the correction state of the aspect ratio of the image corresponding to the digital image data according to the separated correction data, and outputting said correction signal by superimposing it on the signal corresponding to the separated digital image data.

In accordance with yet a further aspect of the invention, an image data recording medium on which compressed digital image data is recorded, is characterized in that, in addition to compressing, correcting the aspect ratio of and recording the digital image data, correction data for further correcting the aspect ratio of the digital image data are multiplexed and recorded with the digital image data.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 1A through FIG. 1G are diagrams showing image data for screens having various aspect ratios and which are selectively corrected to permit display on screens having 4:3 aspect ratios;

FIG. 3A through FIG. 3F are diagrams to which reference is made in explaining the operation of the arrangement in FIG. 2;

FIG. 11 is a table showing in detail the aspect ratio data of Group 1 in FIG. 10;

FIG. 13 is a table showing in detail the aspect ratio labels in FIG. 11;

FIG. 14 is a table showing in detail the values of bit 4 of Group 2 in FIG. 10 for indicating the camera and film modes, respectively;

FIG. 15 is a table showing the content of bit 8 of Group 3 in FIG. 10;

FIG. 16 is a table showing the contents of bits 9 and 10 of Group 3 in FIG. 10;

FIG. 19 is a table showing the contents of WORD1 in FIG. 17;

FIG. 20 is a table showing the contents of WORD2 when WORD1 in FIG. 17 is "0000";

FIG. 21 is a table showing the contents of bits 7 and 8 in FIG. 20;

FIG. 22 is a table showing the contents of WORD2 when WORD1 in FIG. 17 is "0001";

FIG. 23 is a table showing the contents of bits 7 and 8 in FIG. 22;

FIG. 24 is a table showing the contents of bits 9 and 10 in FIG. 22;

FIG. 25 is a table showing the contents of WORD2 when WORD1 in FIG. 17 is "0010";

FIG. 26 is a table showing the content of bit 7 in FIG. 25;

FIG. 27 is a table showing the contents of bits 8 through 14 in FIG. 25;

FIG. 28 is a table showing the contents of the identification signal in XDS;

FIG. 35 is a diagram showing the syntax of the program stream map in FIG. 34;

FIG. 36 is a diagram showing the syntax of global-descriptors in FIG. 35;

FIG. 37 is a diagram showing the syntax of elementary stream descriptors in FIG. 35;

FIG. 38 is a diagram showing the tags of descriptors;

FIG. 39 is a diagram showing the DVD_video_descriptor syntax;

FIG. 40 is a table showing the aspect_ratio_code;

FIG. 41 is a table showing the frame_rate_code;

FIG. 42 is a diagram showing the video syntax;

FIG. 43 is a diagram showing the syntax of user_data;

FIG. 44 is a diagram showing user_data( );

FIG. 45 is a block diagram showing an image data recording device according to an embodiment of the invention;

DETAILED DESCRIPTION OF THE PREFERRED EMBODIMENTS

In accordance with an embodiment of the invention, correction data for correcting the aspect ratio, at least in the squeeze mode or letterbox mode, is transmitted or recorded after multiplexing such correction data with digital image data that has been compressed and initially corrected for aspect ratio. First, a description will be given of a method of transmission of this correction data and other additional data added to other video signals.

The. specifications for transmission of identification signals and additional data are stipulated by CPX-1202 and CPX-1204 in the EIAJ (Electronic Industries Association of Japan).

According to CPX-1202, which specifies "identification signals for video signals with differing aspect ratios, and their method of transmission", the method prescribed for an identification signal is to superimpose a specific level of DC voltage on the S terminal which outputs the video signal. For example, the value of the superimposed DC voltage is specified to be 3 volts for the letterbox mode, 5 volts for the squeeze mode, and 0 volts for other situations. Thus, for example, by appropriately varying this superimposed DC voltage value according to the correction data for the transmitted digital image data, it is possible to specify whether this image data should be corrected for aspect ratio in the letterbox mode or corrected for aspect ratio in the squeeze mode. Correction of the aspect ratio can be controlled according to the value of this DC superimposed voltage at the S terminal during reception and playback.

Figure 6:
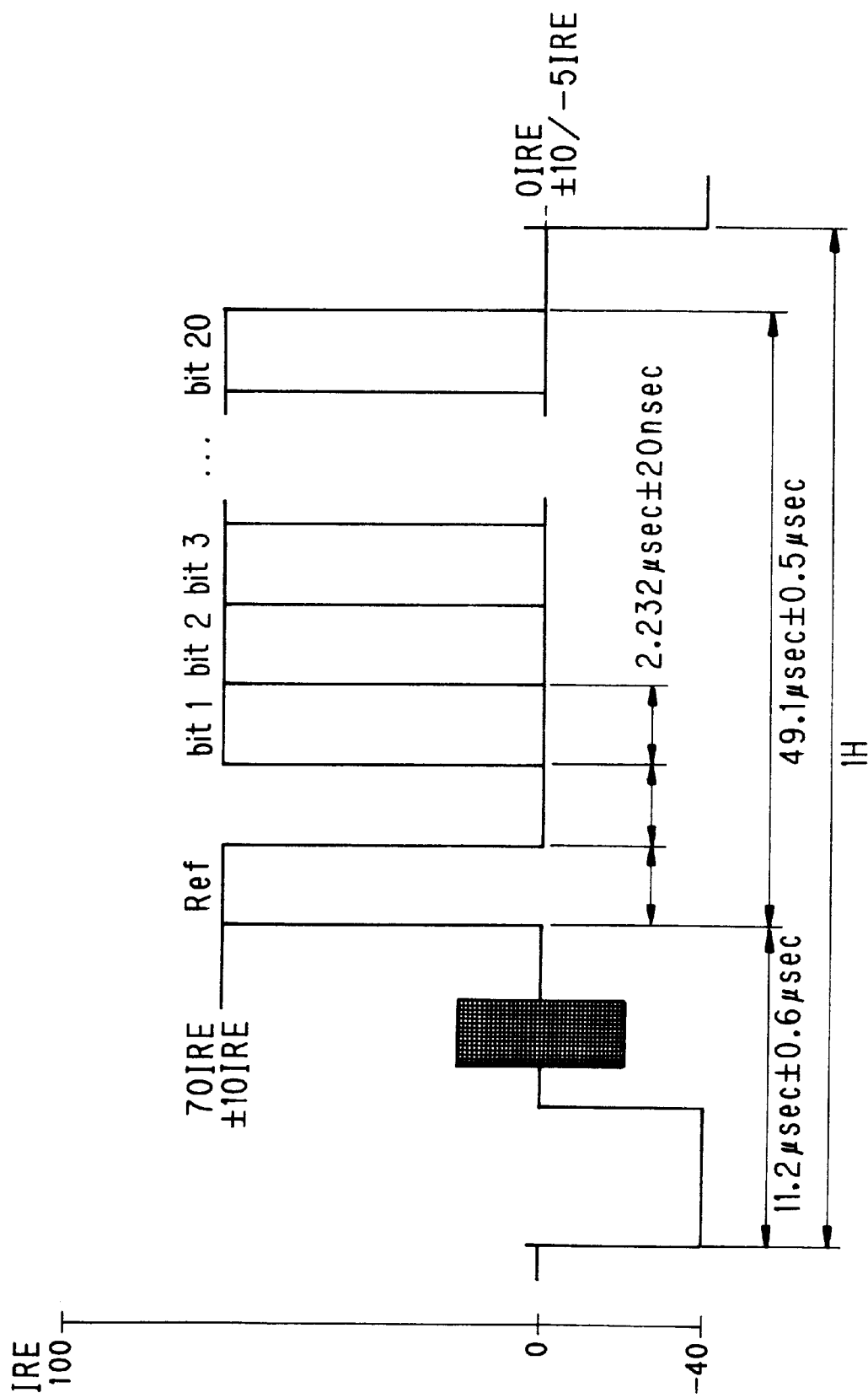
FIG. 6 is a diagram showing the transmission waveform of identification signals specified by CPX-1204 of the EIAJ.

On the other hand, CPX-1024, which provides for "identification signals for video signals with different aspect ratios and their method of transmission (II)" (known as ID-1, video ID), stipulates that a 20 bit identification signal with a signal wave form shown in FIG. 6 shall be encoded and transmitted on the 20th line and 283rd line of the vertical blanking interval of the NTSC luminance signal. In other words, the standard Ref signal is positioned with a 2.232 μs±20 ns width at a location 11.2 μs±0.6 μs from the falling edge of the horizontal synchronization signal, followed by a gap of the same width, and then by 20 bits of data, bits 1–20, of the same width.

Figures 7, 8:
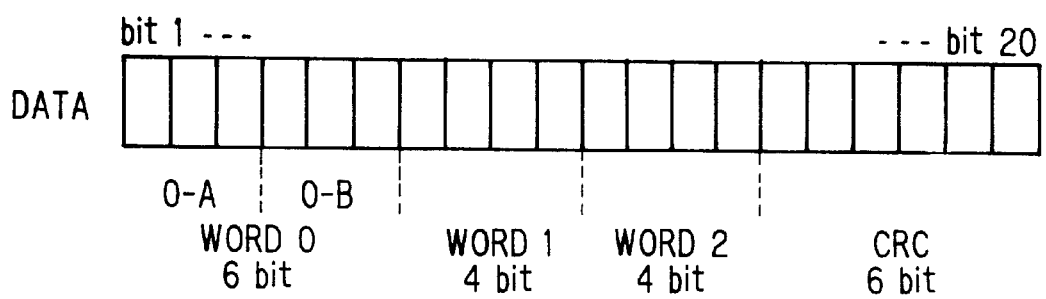
FIG. 7 is a diagram showing the structure of bits transmitted by the waveform in FIG. 6.
FIG. 8 is a diagram showing the content of the bits of WORD0 in FIG. 7.

These 20 bits of data, as shown in FIG. 7, comprise a 6 bit WORD0, a 4 bit WORD1, a 4 bit WORD2 and a 6 bit CRC. WORD0 is in turn comprised of a 3 bit WORD0-A and a 3 bit WORD0-B.

WORD0 is assigned a basic parameter with the main purpose of effecting automatic control at the receiving equipment, and WORD0-A contains, as shown in FIG. 8, identification data relating to the transmission format of the image signal.

In other words, bit 1 of WORD0-A is set to "1" when the aspect ratio of the transmitted image data is 16:9 (when in full mode), and "0" when such aspect ratio is 4:3. Furthermore, bit 2 of WORD0-A is set to "1" when the image display format is letterbox mode and "0" when it is normal.

Identification data relating to the image or to other signals, for example, audio signals or the like, that are transmitted simultaneously with and associated with the image, can be positioned in WORD0-B.

Identification signals subordinate to WORD0 can be positioned in WORD1, and identification signals and data or the like subordinate to WORD0 can also be positioned in WORD2. The CRC code is an error check code, of which the generating polynomial G(X) is X6+X+1, and all the bits are preset to 1.

CPX-1204 defines the situation for television identification signals in accordance with the NTSC system, in other words a system which has 525 lines. In Europe, in the same way, the ETSI (European Telecommunications Standards Institute) stipulates WSS (wide screen signalling) regulations for identification signals in the 625-line PAL system and the SECAM television system.

Figure 9:
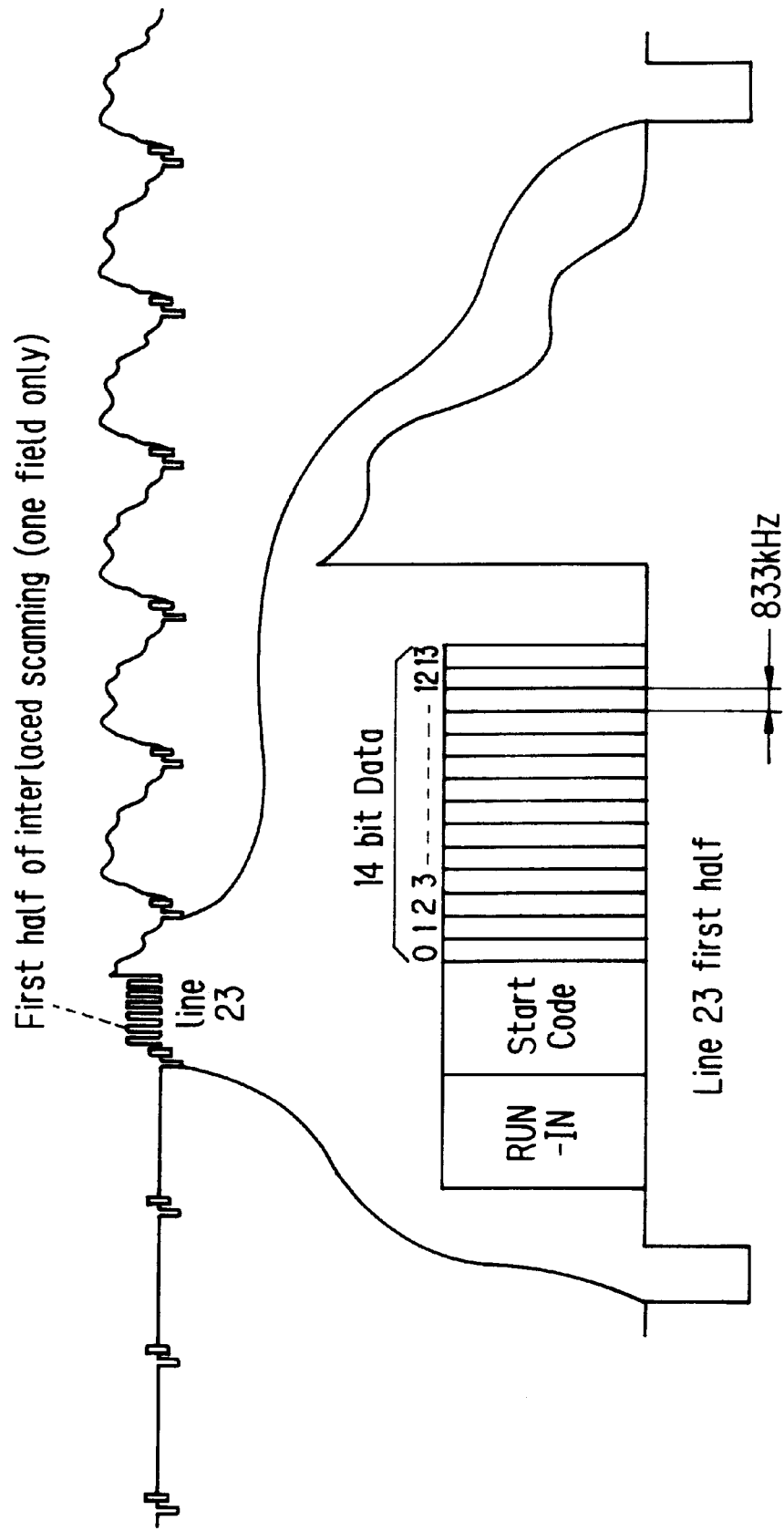
FIG. 9 is a diagram showing the transmission waveform of identification signals in WSS (Wide Screen Signaling)

These WSS regulations stipulate that a 14 bit identification signal be encoded and transmitted on the 23rd line of the PAL signal, as shown in FIG. 9. As also shown in FIG. 9, at the start of the 23rd line there are positions for a run-in for generating a clock, followed by a start code representing the start of the code, and then the 14 bits of data at 833 kHz.

Figure 10:
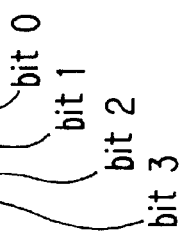
FIG. 10 is a table showing the content of bits transmitted by the waveform in FIG. 9.

As shown in FIG. 10, the aspect ratio data is positioned in the bits of Group 1 which is comprised of the first 4 bits of the 14 bits, the PAL-plus related data is positioned in the next 4 bits comprising Group 2, and the subtitle data is positioned in the next 3 bits comprising Group 3, with the final 3 bits in Group 4 being unassigned.

Figure 4A:
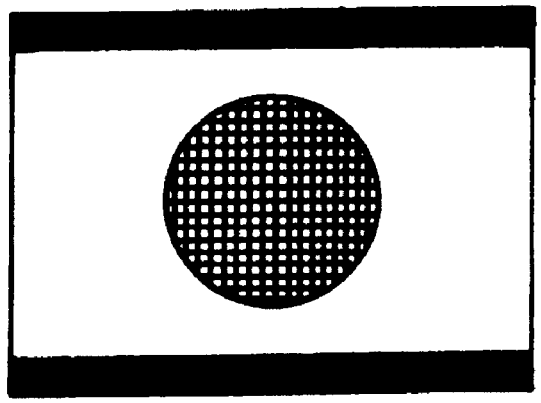
FIG. 4A through FIG. 4C are diagrams showing various display positions of an active image region.

The 4 bits in Group 1 identified as bits $b_3$, $b_2$, $b_1$, and $b_0$ on FIG. 11 set the aspect ratio data by being assigned particular values. For example, when the 4 bits in Group 1 are "1000", this represents an aspect ratio of 4:3, which corresponds to a normal image (full format). When the 4 bits in Group 1 are "0001", this represents the 14:9 aspect ratio of a letterbox image, and indicates that the position of the active image region is in the center, for example, as in FIGS. 4A and 12A.

Figure 4B:
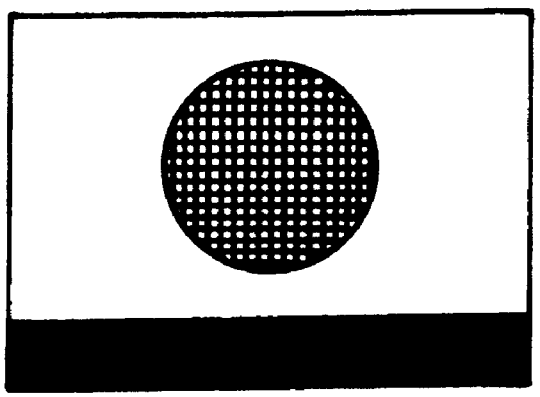
Figure 4C:
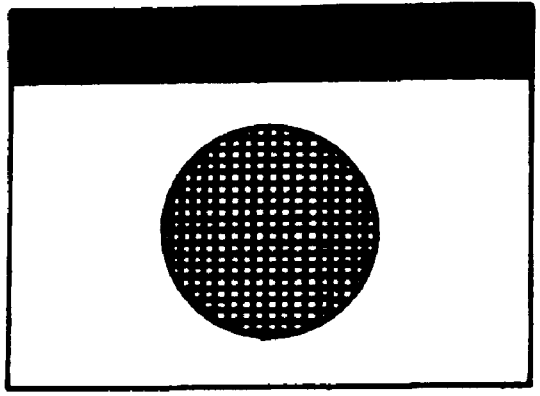
Figure 5A:
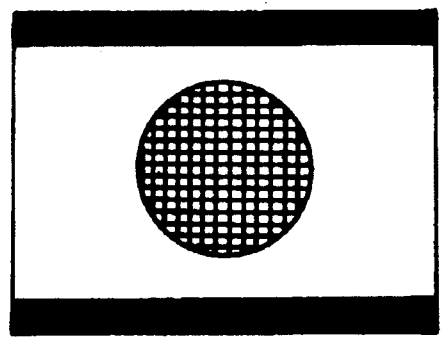
FIG. 5A through FIG. 5D are diagrams showing various display positions of subtitles.
Figure 5B:
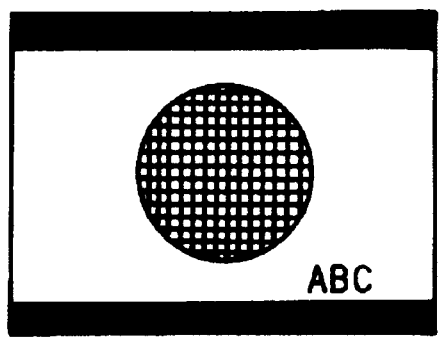
Figure 5C:
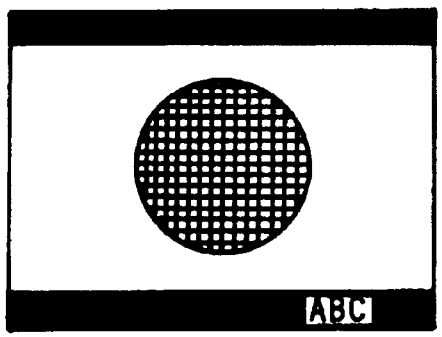
Figure 5D:
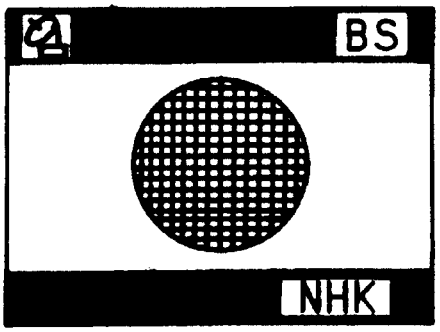
Figure 12A:
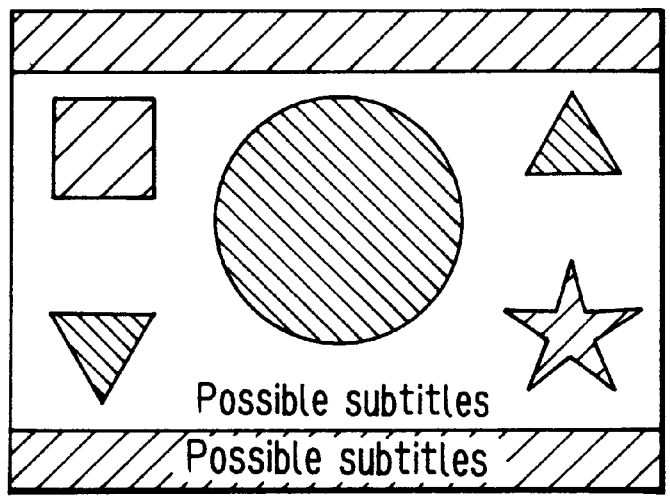
FIGS. 12A and 12B are diagrams showing respective examples of subtitle positioning with the letterbox mode display.
Figure 12B:
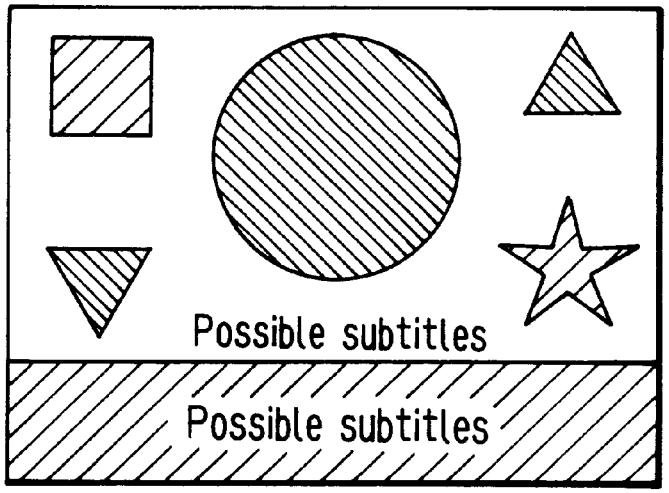

When the 4 bits in Group 1 are "0010", this indicates a letterbox image with a 14:9 aspect ratio, but with the picture being displayed in the top position, as in FIGS. 4B and 12B.

A center letterbox display means that the effective image or active image region is positioned in the middle of the screen, as shown in FIG. 12A, with dark or non-image portions displayed above and below the image. A top display, as shown in FIG. 12B, means that the effective or active image region is displayed only at the top of the screen, with a dark portion displayed at the lower part of the screen.

FIG. 13 gives ranges for the specified aspect ratios shown in FIG. 11. In other words, when set to "1000" the 4 bits in FIG. 11 generally indicate a 4:3 aspect ratio, when set to "0001" a 14:9 aspect ratio is generally indicated, when set to "1011" a 16:9 aspect ratio in generally indicated and when set to "1101" a larger aspect ratio (>16:9) is indicated. More specifically, a 4:3 aspect ratio means that, when expressing the A:B aspect ratio as a (=A/B) as shown in FIG. 13, the value of a is no more than 1.46. Moreover, a 14:9 aspect ratio means that a is greater than 1.46 and no more than 1.66, a 16:9 aspect ratio means that a is greater than 1.66 and no more than 1.90, and an aspect ratio greater than 16:9, means that a is greater than 1.90.

Of the 4 bits in Group 2 of FIG. 10, bit 4, indicated at $b_4$ on FIG. 14, indicates the camera mode when it is "0", and the film mode when it is "1". In other words "0" indicates that the image is from a normal television camera, and "1" indicates that the image has been converted from film by a telecine or the like.

Bits 5 through 7 of Group 2 in FIG. 10 are not used at present.

Bit 8 of Group 3, indicated at $b_8$ in FIG. 15, indicates that there are no subtitles present on the teletext when $b_8$ is "0", and that there are subtitles on the teletext when $b_8$ is "1".

Moreover, when bit 9 ($b_9$) and bit 10 ($b_{10}$) of Group 3 are "00", respectively, as shown in FIG. 16, that indicates that there are no open subtitles, when $b_9$ and $b_{10}$ are "10", there are subtitles on the active image region of the screen, and when $b_9$ and $b_{10}$ are "01", there are subtitles on the dark portion or portions of the screen. At present, $b_9$ and $b_{10}$ being "11" is not used.

The subtitles may be positioned within the active image region of the screen and/or on a dark portion, as shown in FIG. 12A and FIG. 12B.

Bit 1 and bit 2 of WORD0-A in CPX-1204 shown in FIG. 8 can be automatically set according to the WSS aspect ratio data shown in FIG. 11. For example, when $b_3$, $b_2$, $b_1$ and $b_0$ are "0111" in FIG. 11, bit 1 of FIG. 8 is assigned "1", and when $b_3$, $b_2$, $b_1$ and $b_0$ in FIG. 11 are in any other state, bit 1 in FIG. 8 is assigned 0. Moreover, when the bits $b_3$, $b_2$, $b_1$ and $b_0$ in FIG. 11 are "0001", "0010", "1011", "0100" or "1101", bit 2 of FIG. 8 is assigned the value "1", and when the bits $b_3$, $b_2$, $b_1$ and $b_0$ of FIG. 11 are "1000", "1110", or "0111", bit 2 of FIG. 8 is assigned the value "0".

Recently there has been discussion about the expansion of CPX-1204 (hereinafter referred to as expanded CPX-1204). With expanded CPX-1204, of the 20 bits shown for example in FIG. 17, the first two bits are WORD0, the next 4 bits are WORD1, the next 8 bits are WORD2, and the last 6 bits are CRC.

Figures 17, 18:
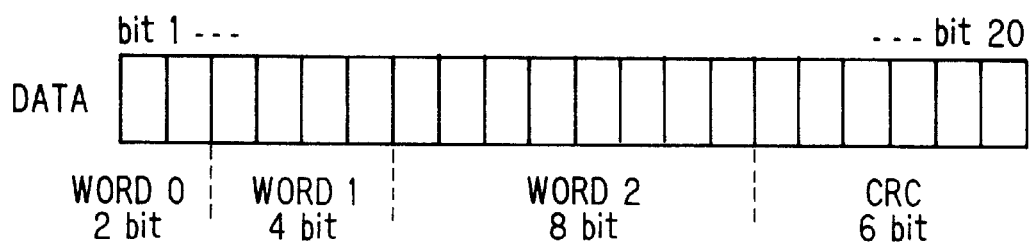
FIG. 17 is a diagram showing the bit structure of extended CPX-1204.
FIG. 18 is a table showing the bit content of WORD0 in FIG. 17.

With expanded CPX-1204, identification data for the image signal transmission format is positioned in WORD0, as shown in FIG. 18. When bit 1 in WORD0 is "1", this indicates that the aspect ratio is a 16:9 full mode (squeeze mode), and when bit 1 is "0", this indicates that the aspect ratio is 4:3. Moreover, when bit 2 of WORD0 is "1", this indicates that the image display format is letterbox, and when bit 2 of WORD0 in "0", this indicates that image display format is normal.

In this way, WORD0 in FIG. 17 is defined so that compatibility is maintained with the bit 1 and 2 portions of WORD0-A in FIG. 7.

Moreover, as shown in FIG. 19, WORD1 represents a header specifying the data transmitted in WORD2. For example, when the 4 bits from bits 3 to 6 are "0000" they indicate that WORD2 is digital copy data, and when bits 3 to 6 are "0001" that indicates that WORD2 is data referring to image format, and when bits 3 to 6 are "0010" that indicates that WORD2 is subtitle position data.

WORD2 indicates data of a type specified by the header of WORD1, and when WORD1 is "0000", thereby indicating digital copy data in WORD2, the content shown in FIG. 20 is specified by the 8 bits from bit 7 to bit 14 in WORD2. In other words, in the embodiment illustrated in FIG. 20, only bit 7 and bit 8 are effectively specified, and the CGMS-A (Copy Generation Management System— Analogue Interface) table shown in FIG. 21 is specified as depending on whether bit 7 and bit 8 are "1" or "0". When the value of bits 7 and 8 is "00" this indicates that the image data may be freely copied, bits 7 and 8 having the value "01" is unused, bits 7 and 8 having the value "10" indicates that only 1 copy is authorized, and bits 7 and 8 having the value "11" indicates that copies are prohibited.

Moreover, when WORD1 is "0001" indicating that WORD2 contains data relating to image format, WORD2 is specified as shown in FIG. 22. In other words, the screen size is determined by bits 7 and 8, as shown in FIG. 23, and the screen position is determined by bits 9 and 10, as shown in FIG. 24.

Furthermore, bit 11 of W0RD2, when it has the value "1", indicates that the subtitles are on the non-image or dark portion, and bit 11 indicates that there are no subtitles when it has the value "0".

As shown in FIG. 23, the screen size is 4:3 when bit 7 and bit 8 are "00", the screen size is 14:9 letterbox mode when bits 7 and 8 are "01", the screen size is 16:9 letterbox mode when bits 7 and 8 are "01", and the screen size is Cinema-Scope letterbox mode when bits 7 and 8 are "11".

Moreover, as shown in FIG. 24, screen position is in the center when bits 9 and 10 are "00", and when bits 9 and 10 are "01" or "10", the screen position is at the top or the bottom, respectively. The value "11" for the bits 9 and 10 is not used.

Furthermore, when WORD1 is "0010", thereby indicating active image region position data including subtitles in WORD2, as shown in FIG. 25, bit 7 of WORD2 indicates, by being "1" or "0", whether the display position for the active image region including subtitles shown by bits 8 through 14 is the top of the screen or the bottom of the screen, respectively, as indicated in FIG. 26.

Moreover, values of 0 through 127 indicated by bits 8 through 14 of WORD2, as shown in FIG. 27, indicate the line number from the top of the screen for the top end or bottom end of the active image region including subtitles. For example when bit 7 is "1" and the value indicated by bits 8 through 14 is 0, the top end of the active image region including subtitles is displayed on the 22nd line from the top end of the screen, and when the value indicated by bits 8 through 14 is 2, it indicates that the top end of the active image region including subtitles is displayed on the 24th line of the screen. Moreover, when bit 7 is "0" and the value indicated by bits 8 through 14 is 0, the bottom end of the active image region including subtitles is displayed on the 262nd line, and when the value indicated by bits 8 through 14 is 2, the bottom end of the active image region including subtitles is the 260th line.

When WORD1 (="0010") is transmitted, it is transmitted at least two times in 2 seconds.

In America, besides using a system similar to CPX-1204, additional data, such as, image aspect ratio data can be transmitted by XDS (Extended Data Services) (formerly known as EDS) specified by EIA-608. With this XDS, a 16 bit signal with parity is inserted on the 21st line and the 284th line of an NTSC television signal, and in this way, as shown in FIG. 28 for example, the position of the active image region and identification of the squeeze mode or normal mode can be transmitted. The start line for the active image region is indicated by the 6 bits S0 to S5 shown in FIG. 28, and the final line of the active image region is indicated by the 6 bits E0 to E5. Moreover, the squeeze mode is indicated when Q0 is "1" and the normal mode is indicated when Q0 is "0".

Figure 29:
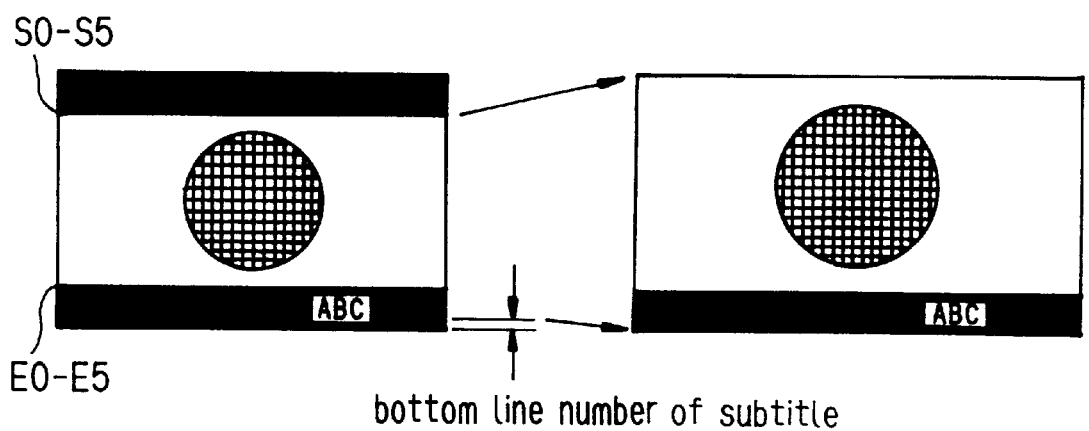
FIG. 29 is a table showing the subtitle position.
Figure 30:
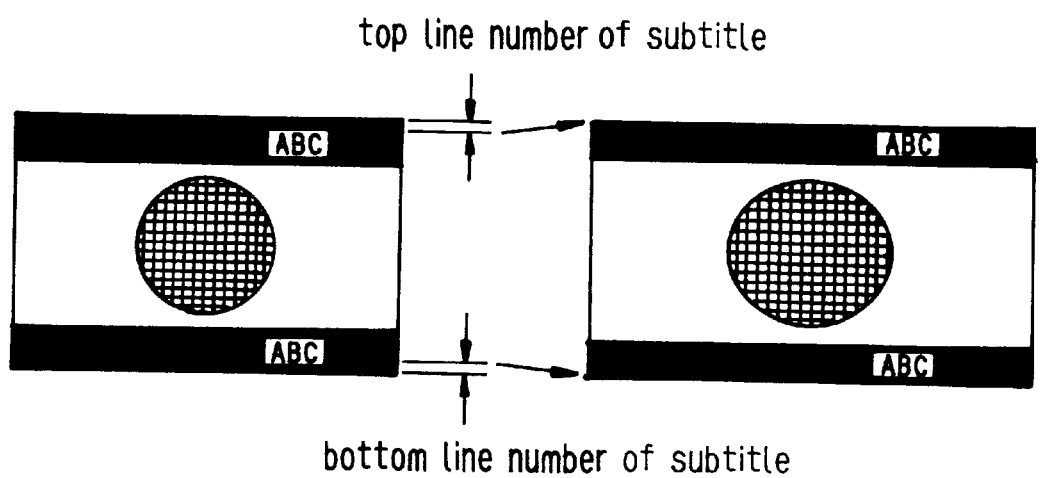
FIG. 30 is another diagram showing the subtitle position.

FIGS. 29 and 30 schematically show this kind of subtitle position information and how it is used. For example, as shown in FIG. 29, the first line of the active image region is represented by bits S0 through S5, and the last line is represented by bits E0 through E5. Moreover, where the bottom line of the subtitles (ABC) is known, the lines from the top line of the active image region to the bottom line of the subtitles can be selected by the vertical filter and displayed.

Moreover, as shown in FIG. 30, when dark portions are added both to the top and bottom of the active image region and subtitles are displayed on both of these dark portions, respectively, if the top line of the upper subtitle and the bottom line of the lower subtitle are known, the range from the top line of the upper subtitle to the bottom line of the lower subtitle can be selected by the vertical filter and displayed. In this way it is possible to arrange for a complete display not only of the active image region but also of the subtitles, without drop outs.

Figure 31:
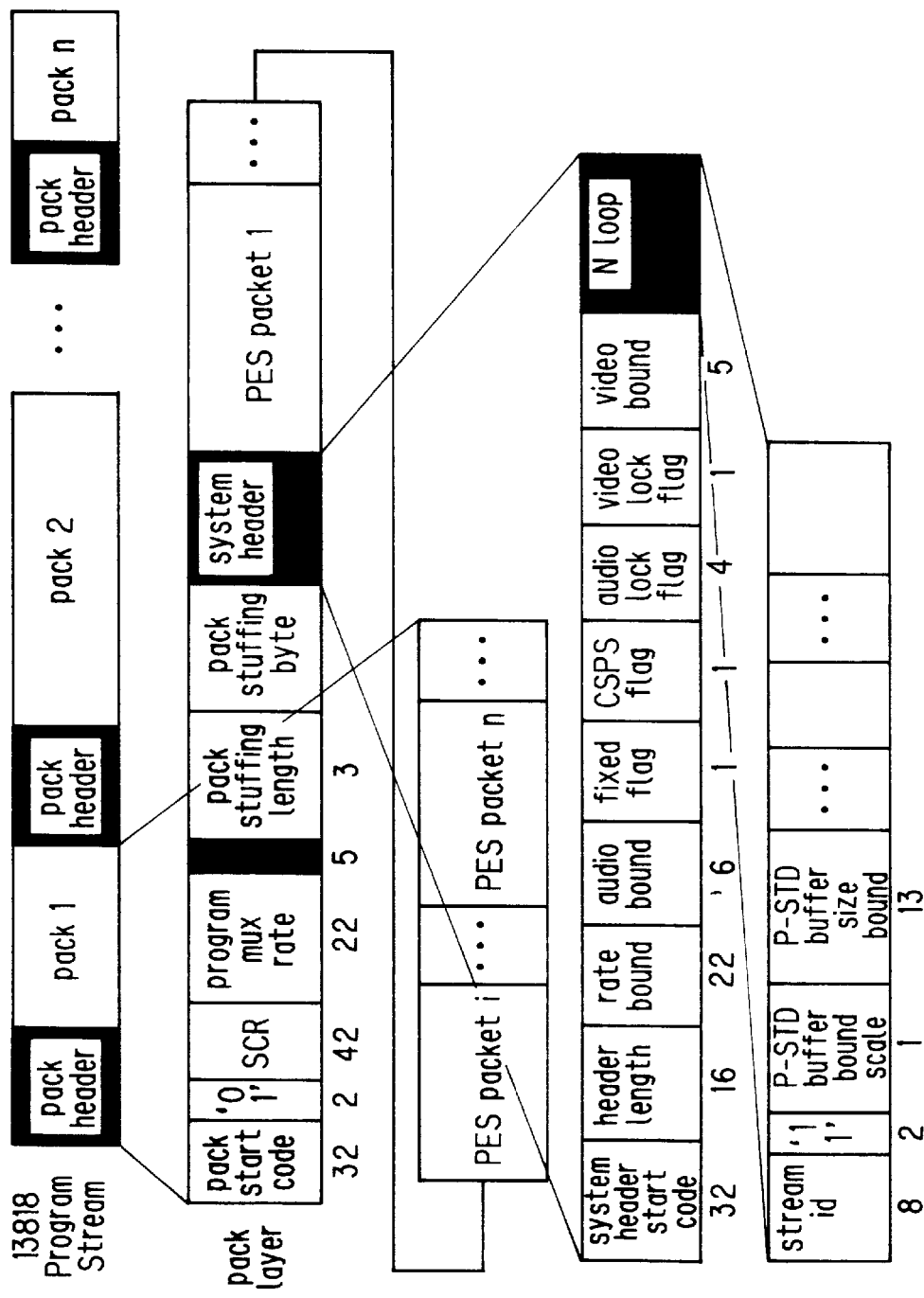
FIG. 31 is a diagram showing the structure of a program stream.

In the embodiment of the invention being here described, identification signal data determined by the above specifications is compressed, using the MPEG system, and transmitted, after multiplexing with digital image data which has its aspect ratio corrected, for example, in the letterbox or squeeze mode. Such transmitted data, upon being received, is recorded in a recording medium or played back on a playback device. The format for such transmission and/or recording will now be described with reference to FIG. 31 which diagrammatically shows the format or syntax of a program stream, for example, an MPEG 2 system stream. In FIG. 31, the program stream is shown to be composed of n packs, with a pack header being positioned at the head of each pack. In addition to a pack start code, an SCR, a program mux rate, a pack stuffing length, a pack stuffing byte and the like being positioned in each pack, PES packets 1 - - - n are sequentially placed after a system header.

The system header is shown to comprise a system header start code, a header length, a rate bound and the like.

Furthermore, a stream id, a P-STD buffer bound scale, a P-STD buffer size bound and the like are included in an N loop of the system header.

Figure 32:
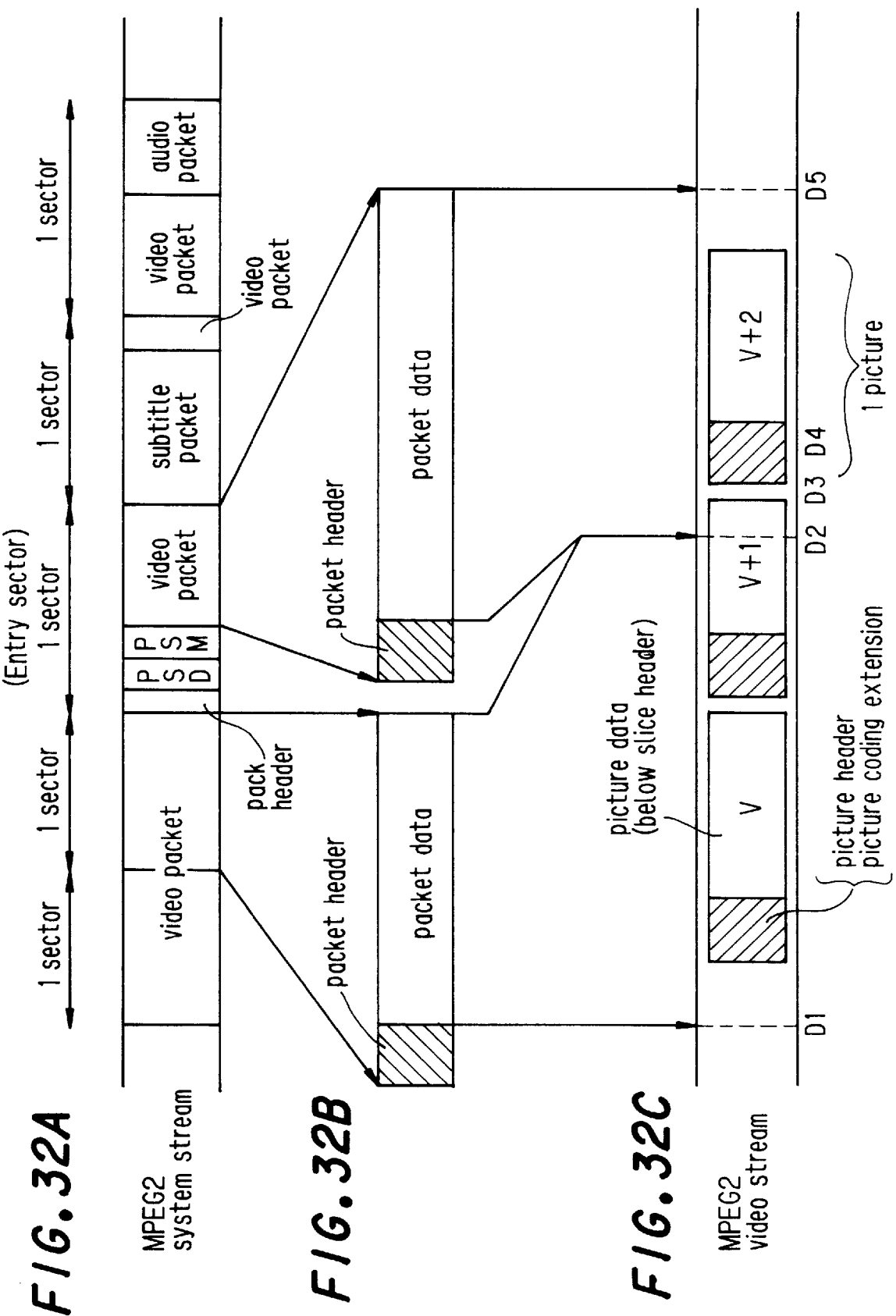
FIG. 32A through FIG. 32C are diagrams showing the data content of the MPEG 2 system stream.

FIG. 32A shows an example of a bit stream which has been multiplexed in accordance with the syntax shown in FIG. 31. In other words, as shown in FIG. 32A, video packets, subtitle packets, audio packets and the like are transmitted in units of a packet. When recording on a disc, the various packets are recorded in units of a sector.

Each packet, as shown in FIG. 32B, is composed of a packet header and packet data. If the packet is a video packet, as shown in FIG. 32C for example, a picture header, a picture coding extension, picture data, and, although not shown in the example of FIG. 32C, a group picture header, a sequence header and a sequence end code can all also be included in this packet data.

Of this picture data, a sector of a video packet containing I picture data is specified as the entry sector. A pack header PSD (Program Stream Director) and a PSM (Program Stream Map) are positioned in this entry sector. In other words, a program stream map (PSM) is positioned immediately before the I picture.

Figure 33:
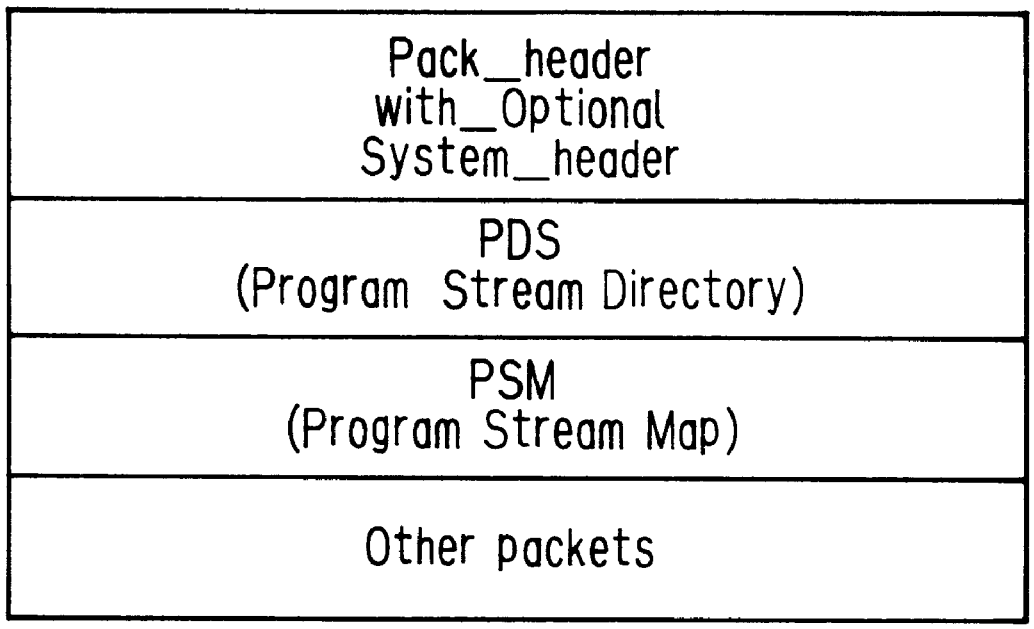
FIG. 33 is a diagram showing the structure of an entry sector of the MPEG 2 system stream.

The overall structure or layout of the entry sector is shown on FIG. 33. More specifically, a pack header is positioned at the head of the entry sector, and a system header is optionally also positioned here. Next come the PSD and the PSM, followed by other packets.

Figure 34:
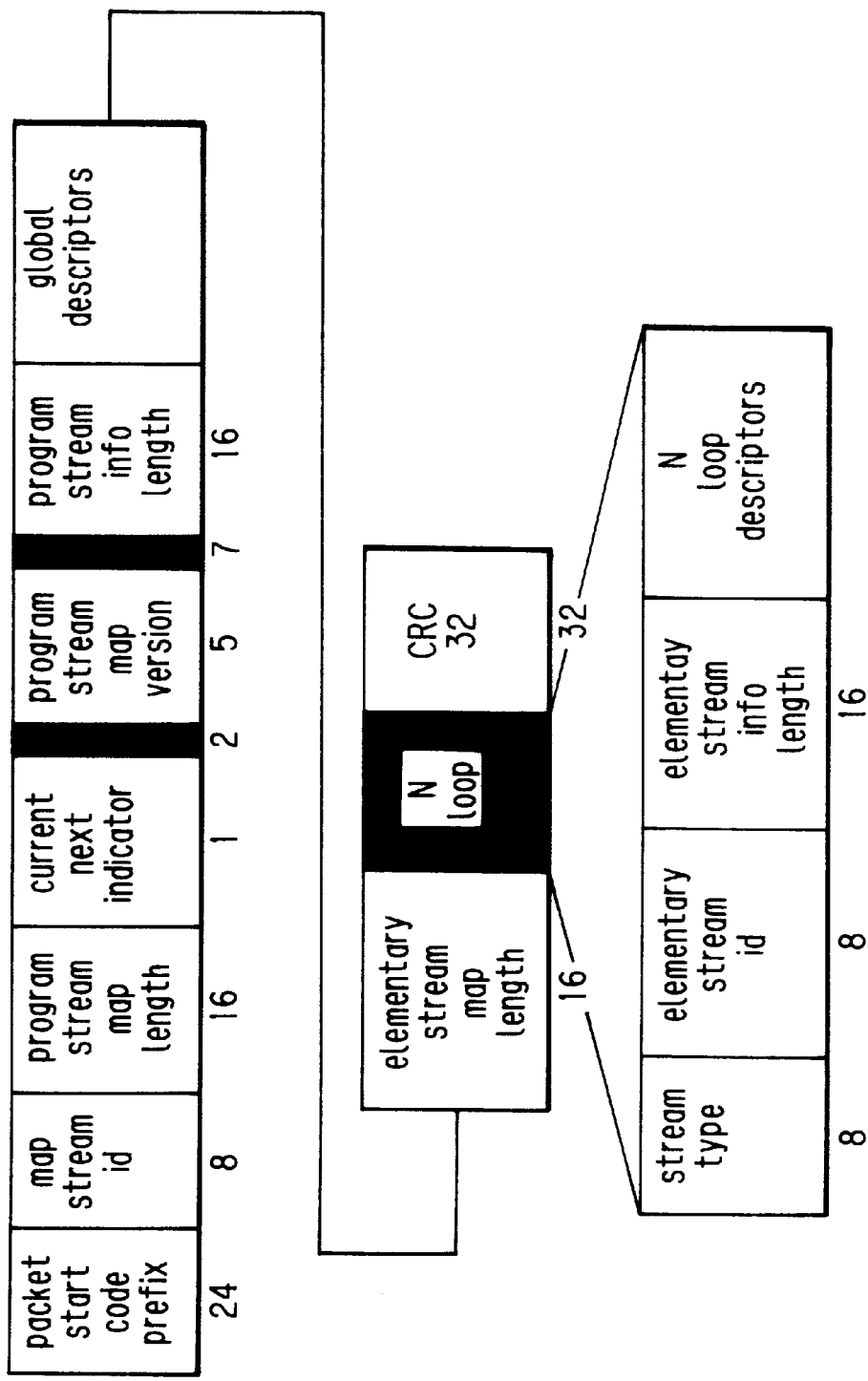
FIG. 34 is a diagram showing the structure of the program stream map in FIG. 33.

The format or syntax of the program stream map (PSM) is shown diagrammatically on FIG. 34 to start with a 24 byte packet start code prefix, followed by an 8 byte map stream ID, a 16 byte program stream map length, and a 1 byte current next indicator and so on.

The syntax of the PSM in FIG. 34 is further shown in FIG. 35 in which bslbf denotes bit string left bit first, and uimsbf denotes unsigned integer msb first. Moreover, rpchof denotes remainder polynomial coefficients highest order first. The syntax of the global_descriptors( ) in the PSM syntax in this FIG. 35 is shown in FIG. 36, and the syntax of the elementary stream descriptors in FIG. 35 is shown in FIG. 37.

In the dvd_video_descriptor( ) in the elementary stream descriptors syntax shown of FIG. 37, a variety of identifying signals are recorded as described later with reference to FIG. 39, but 0xdf is added as a descriptor line tag for this dvd_video_descriptor( ) as shown in FIG. 38. In FIG. 38 various additional descriptor tags are shown for identifying the respective descriptors. Moreover, as shown in FIG. 38, the dvd_video_descriptor( ) is independently specified by DVD (digital video disc) specifications.

The syntax of a dvd_video_descriptor( ) is shown in FIG. 39 in which the descriptor_tag is a tag for identifying this dvd_video_descriptor, and as described with reference to FIG. 38, 0xdf is entered here.

Descriptor_length in FIG. 39 expresses the length of this dvd_video_descriptor. Horizontal_size and vertical_size are respectively coded, and express the horizontal and vertical size of the recorded transmitted image data in pixel units. Display_horizontal_size and display_vertical_size indicate respectively the horizontal length and the vertical length of the rectangular region that is to be displayed. Where this rectangular region is smaller than the coded image region, it is arranged in the display process that part of the coded image is displayed. In the reverse case, that is, where the rectangular region is larger than the coded image region, in the display process the playback image is displayed on part of the display device and the remaining area has dark portions added thereto.

The film_or_camera_flag in the case of WSS (wide screen signalling), as explained with reference to FIG. 14, is a flag indicating whether this image has been taken from a camera or is one converted from a film image to a video signal.

With the closed_gop_flag, the GOP (group of picture) is assigned "1" if reference is not made to the immediately preceding GOP, and "0" if such reference is made.

The still_picture_flag, where a still image is displayed for a specified time, is a flag indicating whether or not it is an image between the first still picture and the last still picture.

Figure 49:
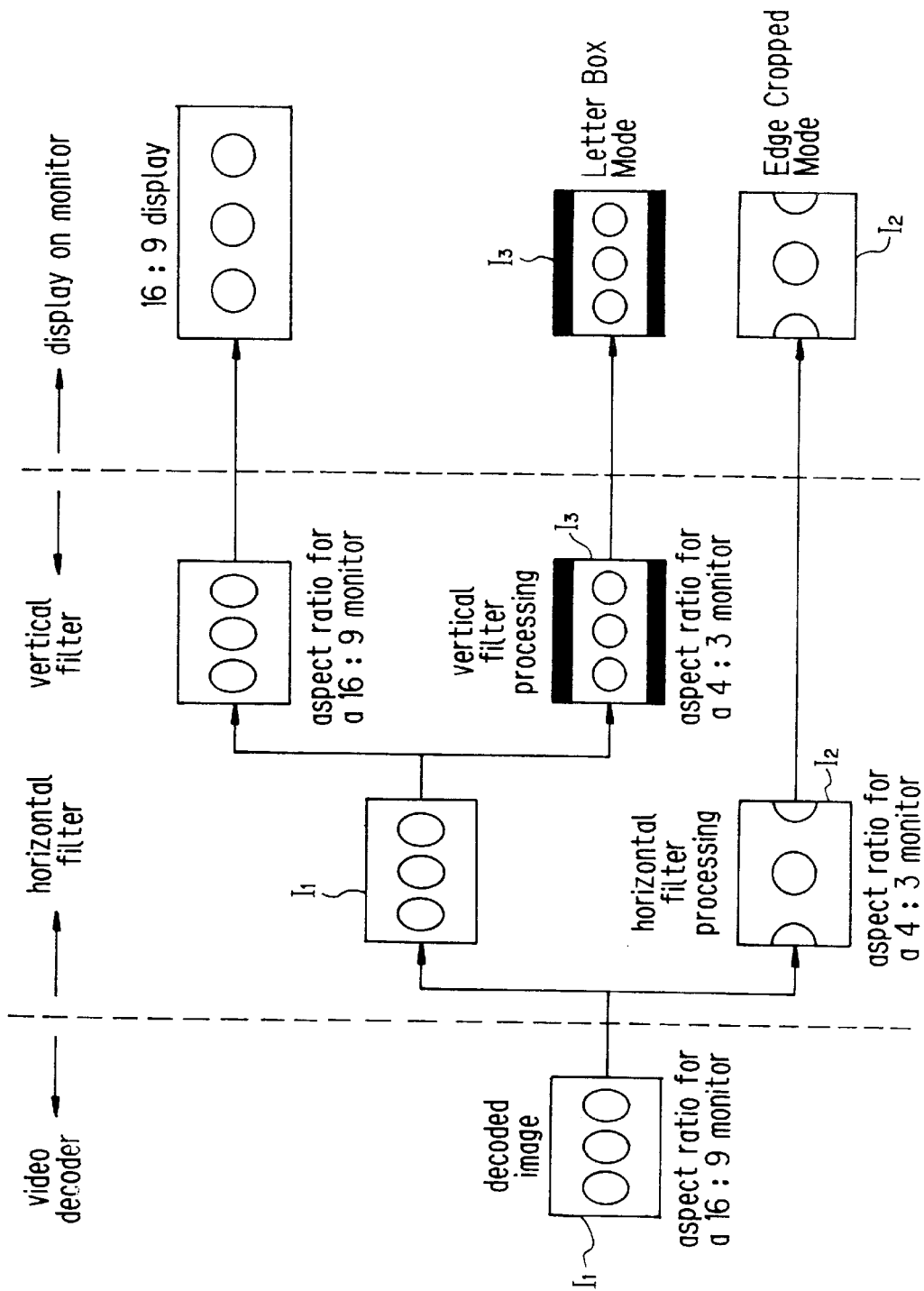
FIG. 49 is a diagram to which reference will be made in explaining the operation of the embodiment in FIG. 48.

The edge_crop_flag in FIG. 39 is a flag indicating whether or not an edge crop mode display, which will be explained later with reference to FIG. 49, is prohibited.

The aspect_ratio_code in FIG. 39 is further shown in FIG. 40 where it is indicated that the value "0000" cannot be used. When the aspect_ratio_code has the value "0001", it indicates that the aspect ratio of the pixels composing the image is 1:1, when the value is "0010" that indicates the display aspect ratio is 4:3, when the value is "0011" that indicates the aspect ratio is 16:9, and, when the value is "0100" that indicates the aspect ratio is 2.21:1.

The frame_rate_code is as shown in FIG. 41, which indicates that use of the value "0000" is prohibited, while the value "0001" indicates that the frame rate of the video signal (frame frequency) is 23.976 Hz, the value "0010" indicates that the frame rate is 25 Hz the value, "0011" indicates that the frame rate is 24 Hz and the value "0100" indicates that the frame rate is 29.97 Hz. Further, the value "0101" indicates a frame rate of 30 Hz, the value "0110" indicates a frame rate of 50 Hz, the value "0111" indicates a frame rate of 59.9 Hz, and the value "1000" indicates a frame rate of 60 Hz.

Further, in FIG. 39, the WSS_aspect_ratio_code indicates aspect ratio data for the 4 bits of Group 1 shown in FIG. 10, and the WSS_subtitles_within_teletext_flag is a flag indicating the presence of bit 8 teletext subtitles amongst the 3 bit subtitle data of Group 3 in FIG. 10 (in other words the flag shown in FIG. 15).

When generating added data under CPX-1204, WSS, extended CPX-1204 and the like, as shown in FIG. 40 it is also possible to use the aspect_ratio_code in place of the WSS_aspect_ratio_code. Moreover, the WSS_subtitling_mode on FIG. 39 is indicated by bit 9 and bit 10 of the 3 bit subtitle data in Group 3 in FIG. 10, and indicates the subtitle position mode (in other words the mode shown in FIG. 16.)

The cgms_a_code on FIG. 39 records the digital copy data in extended CPX-1204 (FIG. 19), in other words the data of bit 7 and bit 8 in FIGS. 20 and 21.

Ext1204_screen_size_code on FIG. 39 records the screen size specified by bit 7 and bit 8 of WORD2 in FIG. 23.

Ext1204_screen_position_code on FIG. 39 records the screen position value specified by bit 9 and bit 10 of WORD2 shown in FIGS. 22 and 24.

Ext1204_subtitle_position_upper and ext1204_subtitle_position_lower on FIG. 39, respectively, indicate the line positions of the upper end and lower end of the top or bottom, respectively, of the subtitles in FIG. 27.

In the above described first embodiment, the various identification signals or added data shown in FIG. 39 are arranged to be recorded in the PSM (program stream map), but it is also possible to record them in the Video_Layer of the User Data rather than in the PSM.

In other words as shown in FIG. 42, in the video syntax specified by MEPG 2, extensions_and_user_data (2) are provided following picture_header( ) and picture_coding_extension( ). Following the syntax of this extensions_and_ user_data (2), it is possible, for example, to record the necessary encoded identification signals as follows.

In the syntax of the user_data specified in MPEG, it is possible to specify the user_data as shown in FIG. 43. As shown in FIG. 44, the user data is recorded in accordance with the MPEG specification, and it will be seen that the content recorded here is essentially similar to that recorded in the dvd_video_descriptor as shown in FIG. 39.

In FIG. 44, marker_bit( ) is an 8 bit string of data 11111111 which, combined with data at either side of it, is inserted to prevent generation or emulation of unusual data such as the user_data_start_code.

An embodiment of a device which transmits identification signals or added data multiplexed with digital video image data for images which have been compressed and had their aspect ratio corrected using the MPEG system, and which records such multiplexed data, using a disc as a recording medium, will now be described with reference to FIG. 45.

In this transmitting and recording device, an audio encoder 102 uses the MPEG system to compress and encode audio signals supplied to the audio input, and outputs them to a multiplexing device 113. A video encoder 101 also uses the MPEG system to compress and encode video signals supplied to the video input, and outputs them to multiplexing device 113. In this case, the stream output from audio encoder 102 is designated as an MEPG 2 audio stream or audio layer, and the stream output from video encoder 101 is designated an MEPG 2 video stream (FIG. 32C).

Moreover, in this embodiment, video encoder 101 is arranged so that it basically encodes images with an aspect ratio of 4:3. Images with a wide aspect ratio, such as, 16:9, 14:9, 2:1 and the like, are input to video encoder 101 after processing for correction of the aspect ratio in the letterbox mode or squeeze mode, as described with reference to FIG. 1A through FIG. 1G.

Multiplexing device 113 divides the MPEG video stream and MPEG audio stream into packets by time-division multiplexing as shown in FIG. 32A.

Although not shown in the diagram, it is also possible to supply a subtitle stream to multiplexing device 113 and to multiplex this together with the video stream and the audio stream. In such case, the MEPG 2 system stream output from multiplexing device 113 will, as shown in FIG. 32A, include subtitle packets in addition to video packets and audio packets.

Multiplexing device 113 forms or holds PSM regions, but this is done by creating blank spaces before multiplexing, with the actual or additional data being written by a PSM data overwrite circuit 155.

The output of an entry detector circuit 131 is supplied to an entry point data memory or storage circuit 133. Entry point data memory circuit 133 receives and stores entry point data, that is, data on the generation point of the I picture as detected and output by the entry point detector circuit 131.

A TOC (table of contents) data generation circuit 156 examines the stored content of entry point data memory circuit 133 and generates TOC (table of contents) data which includes the disc name, chapter names, the start addresses of each chapter on the disc, the required disc playback time, the required chapter playback times, the start address of each entry sector and the like.

The multiplexed stream output from multiplexing circuit 113, after being held temporarily in a DSM (digital storage media) 110, is read out from DSM 110 and supplied to a TOC adder circuit 150. TOC adder circuit 150 adds TOC data generated by TOC data generator circuit 156 to the multiplexed stream supplied from DSM 110 and supplies the resulting output to PSM data overwrite circuit 155.

From the output of video encoder 101, a generator circuit 157 generates PSM data (dvd_video_descriptor) as shown in FIG. 39 and described above, and outputs this to PSM data overwrite circuit 155. PSM data overwrite circuit 155 overwrites the PSM data into the entry sector region in order to write the PSM data in the multiplexed bit stream held by multiplexing device 113.

The output of PSM overwrite circuit 155 is supplied to a sector header adder circuit 151, and here the multiplexed stream is divided by sector and a sector header is added to each sector. Data to which sector headers have been added by sector header adder circuit 151 are input to an ECC (error detection and correction) encoder 152, and an encoding process is carried out to detect and correct errors.

Data output from ECC encoder 152 is input to a modulator circuit 153 where it is, subjected to EFM (Eight to Fourteen Modulation), and the modulated output is transmitted to a transmission path or the like. In this embodiment, such transmission path is constituted by a recording or cutting machine 154.

In cutting machine 154 the multiplexed stream of data is recorded by forming pits in the surface of a disc 160 according to the data input from modulation circuit 153. Using this disc 160 as a master, a plurality of replica DVDs (digital video discs) can be manufactured.

An example of a playback device which reproduces of plays back an optical disc or DVD 1 generated by the above process, will now be described with reference to FIG. 46. The disc 1 is rotated at a particular rate by a spindle motor (not shown) while laser light from a pick-up 2 scans the tracks of optical disc 1 in which the pits have been formed. Thus, the. digital data compressed by the MPEG system recorded in the tracks is read out. This digital data is input to a demodulator circuit 3 and after EFM demodulation therein is supplied to a sector detector circuit 4. The output of pick-up 2 is also input to a phase locked loop (PLL) circuit 9, to regenerate a clock. This regenerated clock is supplied to demodulator circuit 3, sector detector circuit 4 and the like.

As shown in FIG. 32A, the multiplexed stream of data is recorded on optical disc 1 in units which are sectors of fixed length, and at the head of each sector is a sector header (not shown), with a sector sync being added to this sector header. Sector detector circuit 4 detects the divisions between sectors by detecting these sector syncs. Moreover, sector detector circuit 4 detects sector addresses, and supplies these to a control circuit 6 and a track jump decision circuit 7.

Data output from demodulation circuit 3 is input via sector detector circuit 4 to an ECC (error detection and correction) circuit 33, where error detection and correction is carried out. Data for which the error detection and correction process has been performed is written into a ring buffer memory 5 under the control of control circuit 6.

The output of ECC circuit 33 is also input to a PSM detector circuit 40. PSM detector circuit 40 detects the PSM data (added data) in the entry sectors from the input stream data, and outputs the detected PSM data to control circuit 6. Control circuit 6 controls a signal generator 51 according to this PSM data. In response to such control, signal generator 51 generates identification signals supplied to, for example, a 16:9 aspect ratio display 18. A D/A convertor 17 outputs this identification signal to display 18 by inserting it into, for example, line 20 or line 283 of the vertical blanking interval of an NTSC analogous video signal, as described with reference to FIG. 6.

Control circuit 6 specifies the writing address at which this sector data is written in ring buffer 5 using a write pointer WP based on the sector address of each sector supplied from sector detector circuit 4. Furthermore control circuit 6 specifies the reading address at which data is read from ring buffer 5 using read pointer RP based on request signals and codes from a video code buffer 10 in the next step. Data read out from the position indicated by read pointer RP is then supplied to a demultiplexer 32.

A focus servo circuit 25 generates a focus error signal from the output from pickup 2, and is operative to execute the focus servo according to this focus error signal. In the same way, a tracking servo circuit 8 controls pick-up 2 according to a tracking error signal output from pick-up 2, and arranges for the tracking servo to be operated.

A tracking or track jump decision circuit 7 supplies track jump command signals to track servo circuit 8 at a specified timing according to commands from control circuit 6, and causes pick-up 2 to jump or move at high speed to a correct or specified track.

A user interface 31 is operated when the user inputs a specific command, and is arranged so that a corresponding command is input to control circuit 6.

Since the data recorded in optical disc 1 is multiplexed encoded data comprising video data, audio data, subtitle data and so on, demultiplexer 32 separates these types of data from the data supplied from ring buffer 5, supplies the audio data and subtitle data to an audio decoder and a subtitle decoder, respectively, (not shown in the diagram), and supplies the video data to video buffer 10 of a video decoder 20.

Data recorded in video code buffer 10 is supplied, in part, to a picture header detector 34. Picture header detector 34 detects picture headers from the data input thereto, and from these picture headers it detects type data indicating I, P and B picture types and temporal reference (TR) data indicating the screen order within the GOP (group of pictures). The detected picture type data is further supplied to a picture data selector circuit 35. Picture data selector circuit 35 selects only I pictures and P pictures during special playback, and is controlled to supply them from video code buffer 10 to an inverse variable length coder (VLC) circuit 11.

During normal playback, picture data selector circuit 35 does not select pictures based on picture type, but is controlled so as to supply all types of pictures from picture code buffer 10 to inverse VLC circuit 11.

Data supplied to inverse VLC circuit 11 and there subjected to inverse VLC processing, is thereafter supplied to an inverse quantizing circuit 12. Moreover, at this time inverse VLC circuit 11 sends code request signals to video code buffer 10, and receives new data transferred from video code buffer 10.

Furthermore, in addition to outputting data indicating the quantize step size to inverse quantizing circuit 12, inverse VLC circuit 11 outputs motion vector data to a motion compensation circuit 15. Inverse quantizing circuit 12 quantizes data supplied from inverse VLC circuit 11 according to a quantize step size signal supplied from inverse VLC circuit 11 and supplies this to an inverse discrete cosine transform (DCT) circuit 13. After inverse DCT processing of the data input to circuit 13, the resulting output of circuit 13 is supplied to an addition circuit 14.

Addition circuit 14 adds together the output of. inverse DCT circuit 13 and the output of motion compensation circuit 15 according to the picture type (I,P, B) and outputs the result to a frame memory bank 16.

Frame memory bank 16 is provided with 3 frame memories 16a, 16b, 16c and with a switch 16d which selects one of the memories 16a, 16b, and 16c for writing therein, and a switch 16e which selects one of the memories 16a, 16b and 16c fp reading therefrom. By such means, each decoded frame image is supplied to D/A convertor 17 after reverting to the original frame sequence. Moreover, data read out from frame memory banks 16a, 16b, 16c is supplied where appropriate to motion compensation circuit 15 which provides therefrom motion prediction data supplied to addition circuit 14.

D/A convertor 17 has an NTSC encoder or a PAL encoder built into it, and is arranged to receive digital picture data supplied from switch 16e, and to convert such data to an NTSC or PAL analog video signal which is supplied to display 18.

Operation of the device of FIG. 46 in controlling the aspect ratio correction state in accordance with detected PSM data will now be explained. Pick-up 2 plays back data recorded on optical disc 1 and outputs such data to demodulation circuit 3. Demodulation circuit 3 performs EFM demodulation of the reproduced data, and outputs the demodulated data to ECC circuit 33 through sector detector circuit 4. After performing error detection and correction, ECC circuit 33 supplies the corrected data to ring buffer 5 which temporarily stores the same.

Data read out from ring buffer 5 is input to demultiplexer 32 which separates subtitle data and audio data from the input data and supplies the subtitle data and audio data, respectively, to a subtitle decoder and an audio decoder (not shown). The demultiplexer 32 also separates the video data from the remainder of the data read from buffer 5 and outputs the separated video data to video code buffer 10.

Data stored in video code buffer 10 is supplied to inverse VLC circuit 11 and, after inverse VLC processing therein, is inverse quantized in inverse quantizing circuit 12 before being subjected to DCT processing in inverse DCT circuit 13. Data output from inverse DCT circuit 13 is written in one of the frame memories 16a, 16b or 16c through switch 16d after compensating for motion at addition circuit 14 with data output from motion compensation circuit 15.

Data written into frame memories 16a through 16c is then read out in the original frame sequence through switch 16e, and is then converted to an NTSC analog video signal at D/A convertor 17, prior to being output to a 16:9 aspect ratio display 18 where a corresponding image is displayed.

At the same time, PSM detector circuit 40 detects PSM data in the data output by ECC circuit 33, and outputs such detected PSM data to control circuit 6. Control circuit 6 outputs control signals corresponding to the PSM data from detector circuit 40 to signal generator 51. Signal generator 51 generates specific identification signals corresponding to such control signals, and outputs the identification signals to D/A convertor 17. These signals, as described above with reference to FIG. 39, are signals corresponding to the content of DVD_video_descriptor.

Figure 2:
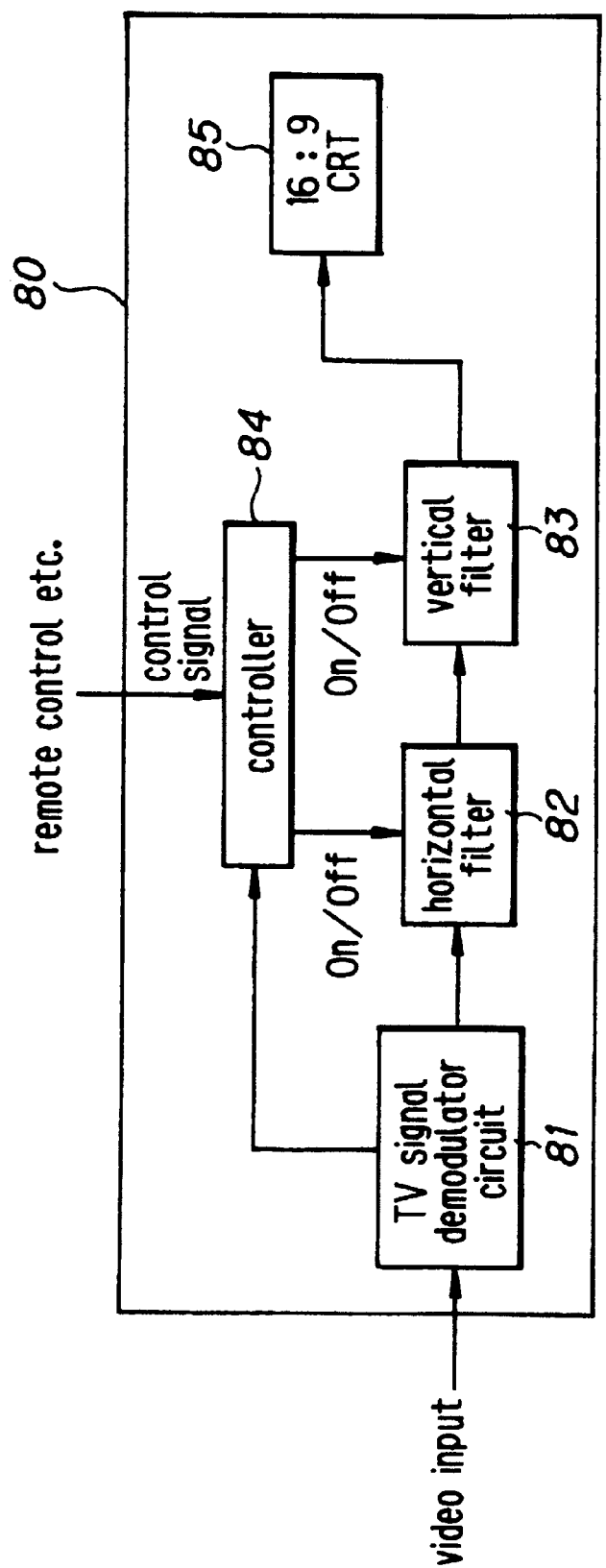
FIG. 2 is a block diagram showing a user controlled arrangement in a conventional wide screen television set having a display with a 16:9 aspect ratio, and by which input images with a 4:3 aspect ratio can be displayed.

If a wide screen television set 80 with a 16:9 aspect ratio CRT 85, a horizontal filter 82 and a vertical filter 83, as shown in FIG. 2, is connected as display 18 in the circuit of FIG. 46, signal generator 51 outputs PSM data to D/A convertor 17, and D/A convertor 17 inserts this PSM data in, for example, line 20 or line 283, as explained with reference to FIG. 6, of the signal then supplied to television set 80.

In television set 80, as shown in FIG. 2, the video signals and the identification signals are separated, from each other by television signal demodulator circuit 81, and the video signals are output to CRT 85 through horizontal filter 82 and vertical filter 83. Moreover, the separated identification signals are supplied from demodulator circuit 81 to controller 84. Controller 84 controls horizontal filter 82 and vertical filter 83 in accordance with the separated identification signals.

Thus, for example, identification signals indicating whether or not the accompanying data has been aspect ratio corrected in the letterbox mode or identification signals which indicate that the accompanying data has been aspect ratio corrected in the squeeze mode are included in the correction data as frame data. When supplied with identification signals that indicate neither letterbox mode nor squeeze mode (in other words, normal mode identification signals), controller 84 switches on horizontal filter 82 and switches off vertical filter 83. As a result of the foregoing, dark portions are added to the left and right of a 4:3 aspect ratio active image region as shown in FIG. 3A and a 16:9 aspect ratio screen is displayed on 16:9 aspect ratio CRT 85, as shown on FIG. 3D.

If the image is in the letterbox mode, as in FIG. 3B, controller 84 responds to the corresponding identification signals by switching horizontal filter 82 off and vertical filter 83 on. By this means, as shown in FIG. 3E, only the active image region is extracted by vertical filter 83, and displayed on CRT 85 as a 16:9 aspect ratio screen.

If the image is in the squeeze mode, as shown on FIG. 3C, controller 84 responds to the corresponding identification signals by switching off both horizontal filter 82 and vertical filter 83. As a result, as shown in FIG. 3F, a horizontally compressed 4:3 aspect ratio image is extended in the horizontal direction in a 16:9 aspect ratio CRT 85, and displayed as a normal 16:9 aspect ratio image.

Moreover, when signals specifying the active image region position and the subtitle position, for example, are included in PSM data as shown in FIGS. 17–27, the television set 80 generates a signal by which the lines to be displayed are determined so that there is no subtitle dropout.

As shown in the left-hand portion of FIG. 29, for example, if the video input to the television set 80 has dark portions added to the top and bottom of the screen, as by a letterbox conversion, and subtitles are positioned on the lower of the two dark portions, omitting the upper and lower dark portions, as in FIG. 3E, would cause drop out of the subtitles intended to appear in the lower dark portion. However, in the circuit embodying this invention as shown on FIG. 46, signal generator 51 generates a signal including range data and transmits it to the television set 80 via D/A convertor 17 so that the range from the top line of the active image region to the bottom line of the subtitles is extracted by vertical filter 83 of the television set and the full image and the subtitles are displayed on the 16:9 aspect ratio CRT 85.

Alternatively, as shown in the left-hand portion of FIG. 30, if subtitles are present in both the upper and lower dark portions, a signal including range data is generated by signal generator 51 so that the range from the top line of the upper subtitles to the bottom line of the lower subtitles is extracted by the vertical filter 83, and this is transmitted to television set 80 by D/A convertor 17. In this way, the 16:9 aspect ratio CRT 85 displays the full image and the subtitles in the upper and lower dark portions.

In the above manner, digitally recorded compressed and aspect-ratio- corrected images can be played back from optical disc 1 and displayed in the same way as analog recorded compressed and aspect-ratio corrected images.

Figure 46:
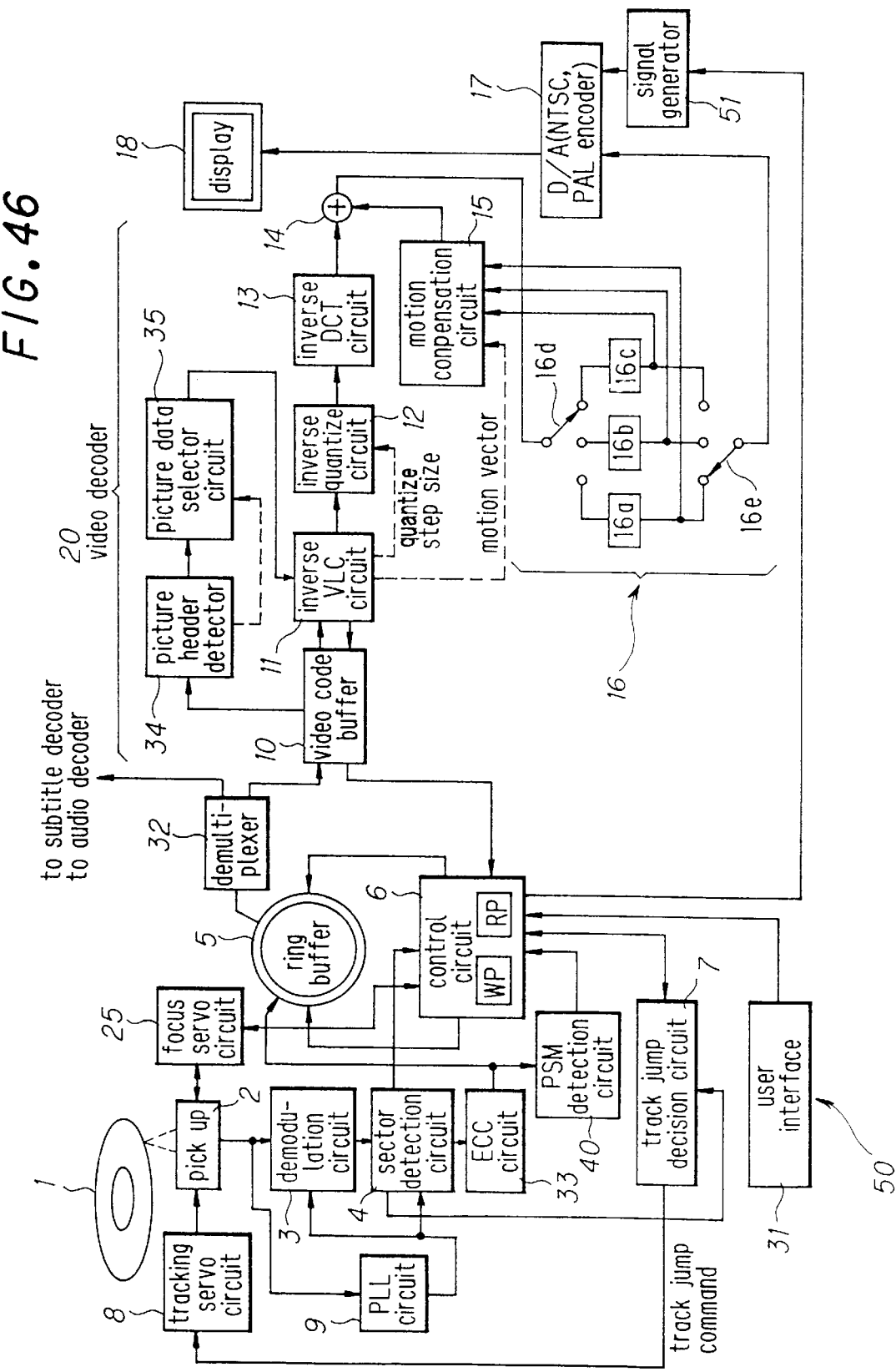
FIG. 46 is a block diagram showing an optical disc playback device according to an embodiment of the invention.
Figure 47:
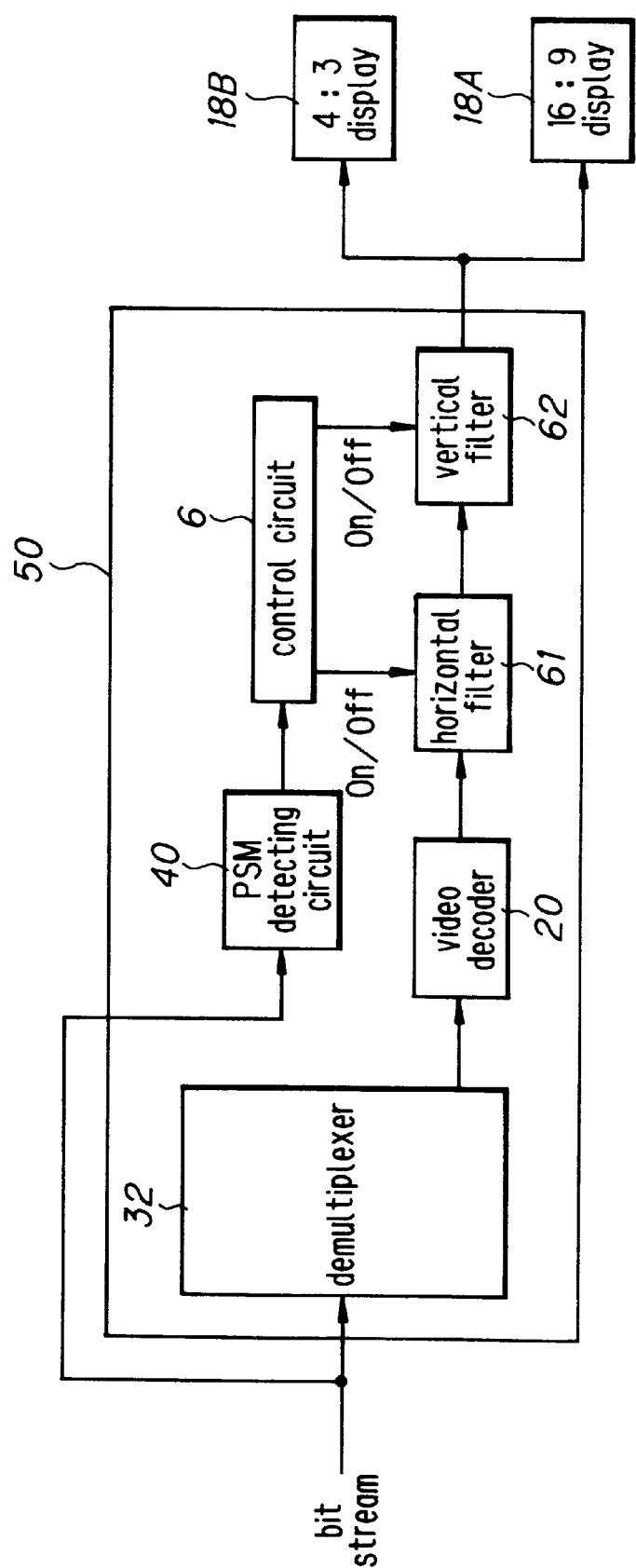
FIG. 47 is a block diagram generally showing another example of an optical disc playback device according to an embodiment of the invention.

In the embodiment of the invention shown in FIG. 46, the horizontal filter 82 and the vertical filter 83 are not built into the optical disc playback device indicated generally at 50, but rather are part of the television set 80 having a 16:9 aspect ratio CRT 85, as in FIG. 2, and which is used for the display 18 in FIG. 46. However, taking into account the fact that a playback device may be normally connected to a 4:3 aspect ratio display, it is also possible to provide such horizontal and vertical filters in the playback device in accordance with this invention. In other words, as shown schematically in FIG. 47, in an optical disc playback device 50A according to this invention which is otherwise the same as that described above with reference to FIG. 46, video signals output from demultiplexer 32 are supplied to video decoder 20, and video data output from video decoder 20 is output to display 18A or 18B through a horizontal filter 61 and a vertical filter 62. PSM data detected by PSM detector circuit 40 is supplied to control circuit 6 which controls horizontal filter 61 and vertical filter 62 in accordance which such PSM data. In the embodiment of FIG. 47, it is possible to connect either display 18A, which is a wide screen television set having a 16:9 aspect ratio, as the display 18 in FIG. 46, or, alternatively, a normal NTSC television set 18B with a 4:3 aspect ratio may be connected as the display 18.

Figure 48:
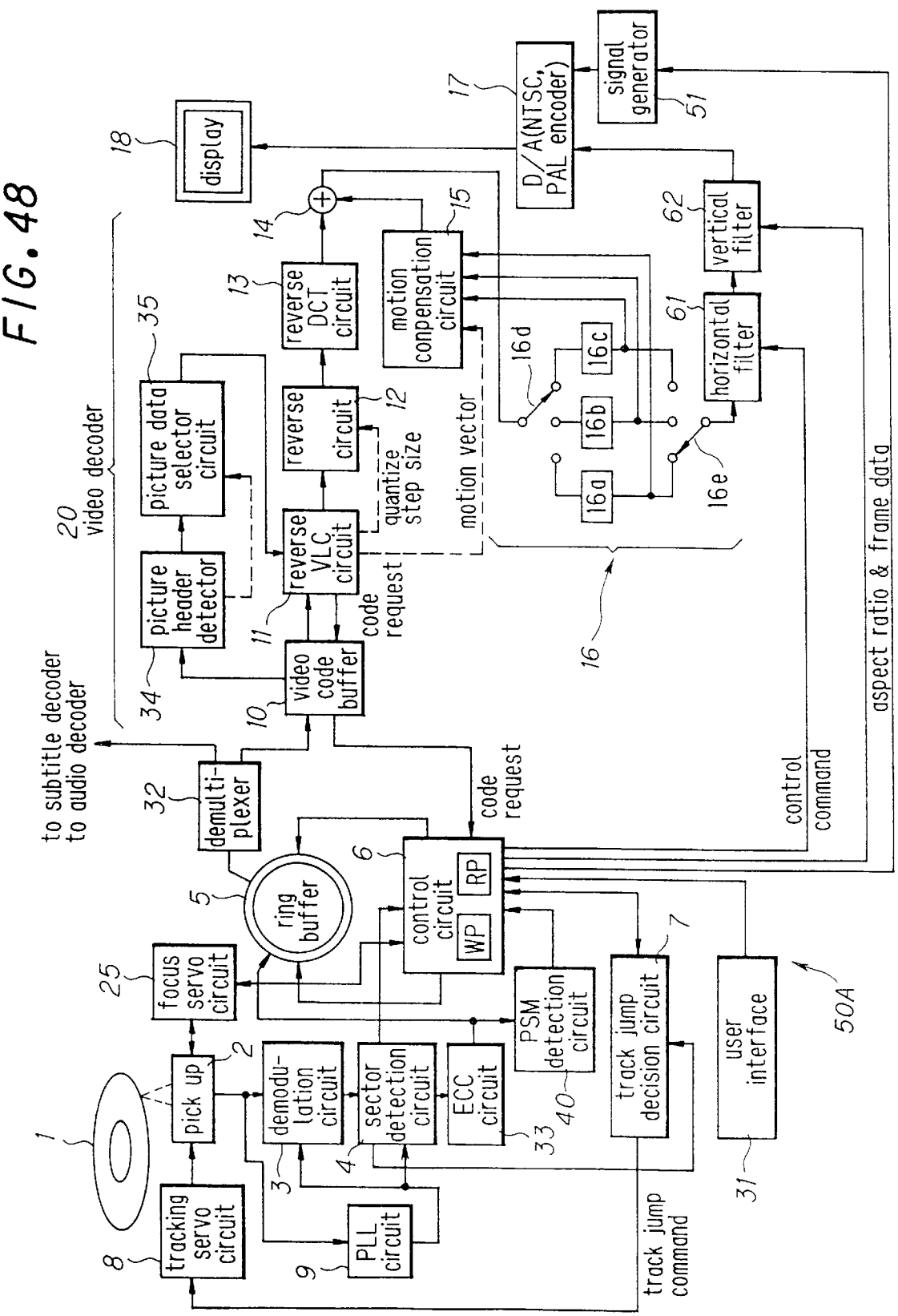
FIG. 48 is a block diagram showing a more detailed example of the structure of the embodiment in FIG. 47.

FIG. 48 shows in greater detail the manner in which the embodiment illustrated schematically in FIG. 47 may be actually arranged. As shown in FIG. 48, in this embodiment video data output from frame memory bank 16 is supplied through switch 16E to D/A convertor 17 by way of horizontal filter 61 and vertical filter 62. Horizontal filter 61 and vertical filter 62 are controlled, as previously noted, according to control signals output from control circuit 6. Apart from the foregoing, the apparatus in FIG. 48 is the same as described above with reference to FIG. 46.

In the embodiment of FIG. 48, the user issues an instruction through user interface 31 to control circuit 6 for indicating whether display 18 connected to optical disc playback device 50A is a 16:9 aspect ratio device 18A or a 4:3 aspect ratio device 18B. This instruction may be formed by actuating a predetermined switch constituting user interface 31.

When display 18 connected to optical playback device 50A is display 18A having a 16:9 aspect ratio, and which includes the filters 82 and 83 and controller 84 as integral parts of the display, as in FIG. 2, control circuit 6 switches off horizontal filter 61 and vertical filter 62. Thus, in this case the structure becomes effectively the same as the embodiment shown in FIG. 46, and the operation is the same as has been previously described for that embodiment.

With display 18B having an aspect ratio 4:3, there is no horizontal filter or vertical filter included in such television set or display 18B. In the case where such display 18B with a 4:3 aspect ratio is connected as display 18 in FIG. 48, control circuit 6 controls built in horizontal filter 61 and vertical filter 62 in the following way:

When the image being reproduced is in the normal mode, horizontal filter 61 and vertical filter 62 are both switched off. As a result a normal image is displayed on 4:3 aspect ratio display 18B.

When the image being reproduced or played back is in the letterbox mode, control circuit 6 switches off both horizontal filter 61 and vertical filter 62. As a result, dark portions are added to the top and bottom, and an image adjusted to an overall 4:3 aspect ratio is displayed on display 18B.

When a squeeze mode image is played back, for example, the image indicated at $I_1$ on FIG. 49, control circuit 6 controls horizontal filter 61 and vertical filter 62 as follows. More specifically, in that case, control circuit 6 switches on horizontal filter 61 and switches off vertical filter 62. As a result, part of the image compressed in the horizontal direction by horizontal filter 61 is cut out and then the remaining image is extended in the horizontal direction, so that the image is displayed in the edge cropped mode on the 4:3 aspect ratio display 18B, for example, as indicated at $I_2$ on FIG. 49.

In this edge cropped mode shown in FIG. 49, parts of the active image region (the left and right edges of the image) drop out. As a result, there are cases where, due to copyright and other considerations, this edge cropped mode is prohibited. In cases where this edge cropped mode display is banned as indicated by an edge_crop_flag, control circuit 6 switches off horizontal filter 61 and switches on vertical filter 62.

Vertical filter 62 compresses in the vertical direction a squeeze mode image which has been compressed in the horizontal direction, converting it to an image with a normal or 4:3 aspect ratio, and furthermore adds dark or non-image portions above and below the active image region, creating an image $I_3$ with an overall aspect ratio of 4:3. In other words it generates an image in letterbox mode. Thus this letterbox mode image $I_3$ is output for display on display 18B which has a 4:3 aspect ratio.

During such letterbox mode display, the user may manually activate an edge cropped mode display with control circuit 6, thereby switching off vertical filter 62 and switching on horizontal filter 61. However, as explained above, in cases where this edge cropped mode display is prohibited, control circuit 6 will not accept this manual command.

In the same way, it is possible to manually switch from the edge cropped mode to the letterbox mode.

When changing the image aspect ratio using horizontal and vertical filters within the playback device, control circuit 6 controls the data generated by signal generator 51 so that it represents the aspect ratio of images after passing through the filters. By this means, even if the user interface 31 is made to indicate that a 4:3 display is connected to the playback device, it is possible at least to ensure a display of the correct aspect ratio where, for example, a 16:9 display is in fact connected to the playback device.

In the above embodiment, additional data is encoded in the PSM of the system layer as part of the identification signal, but it is also possible to encode the additional data as a private packet defined in the MPEG system layer. Alternatively, the additional data can be encoded as part of the extensions_and_user_data(0) following the sequence_header for each sequence or encoded as part of the extensions_and_user_data(1) following on from the Group of Picture_header for each Group of Picture, or encoded as part of the extensions_and_user_data(2) for each Picture (FIG. 42). Furthermore, it is also possible to record in the so-called TOC region, where information about the disc and a plurality of programs is recorded, and which is situated at a specific position on the disc for each optical disc or other recording medium, as previously disclosed in Japanese Patent Application No. H 7-61411.

In the above-mentioned embodiment of the replay device, a description has been given for a NTSC device, but the same effect can be obtained for the PAL system by using the above-mentioned WSS signal instead of CPX-1204 and its extended version.

Figure 50:
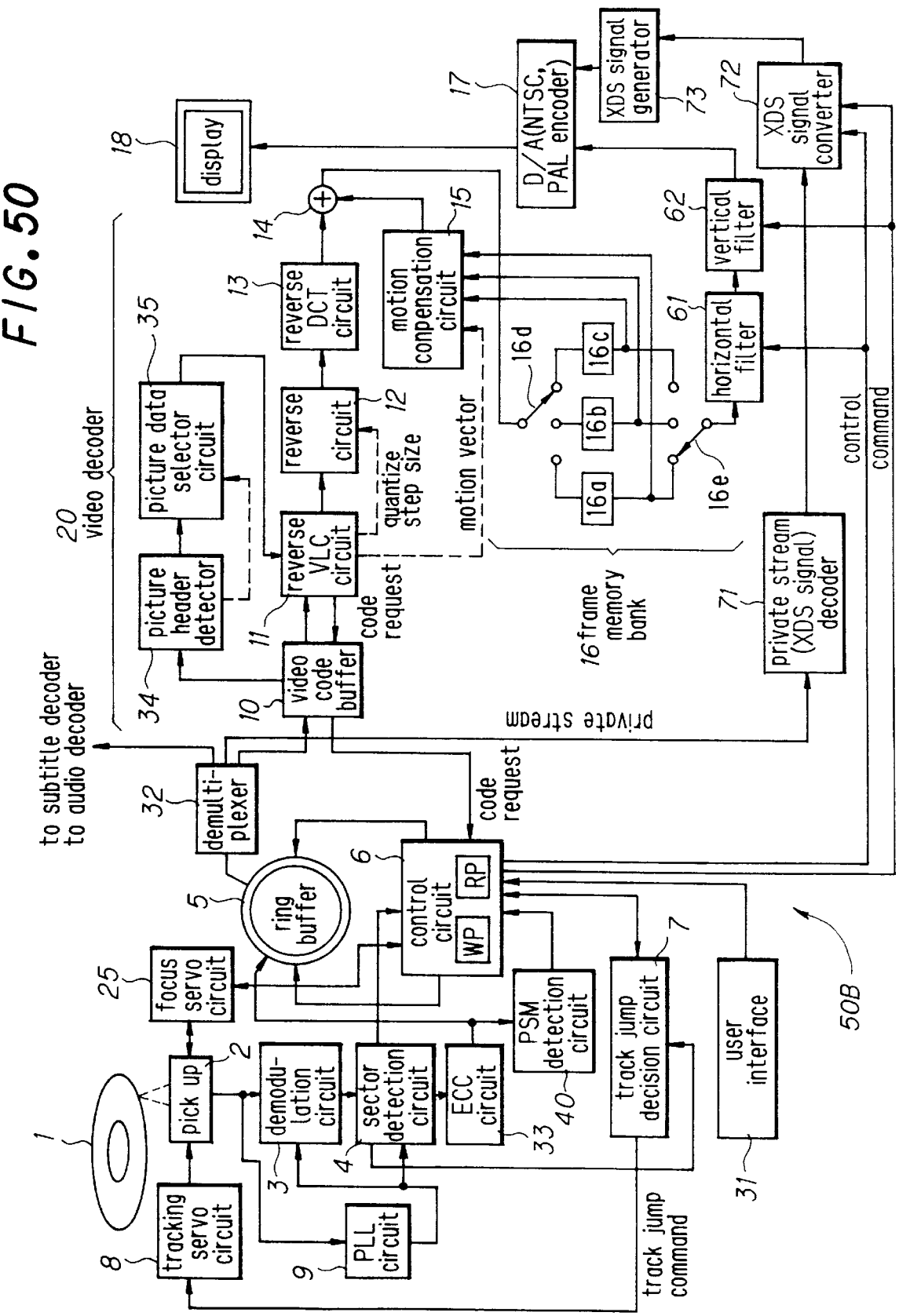
FIG. 50 is a block diagram showing an optical disc playback device according to still another embodiment of the invention.

FIG. 50 shows an example of an optical disc playback device 50B similar to that shown in FIG. 48, and in which the extended data service (XDS) is recorded in a Private Stream defined in the MPEG System layer as disclosed previously in Japanese Patent Application No. H 7-6902. As shown in FIG. 50, in this embodiment the private stream is separated by the demultiplexer 32 from the data read from ring buffer 5, and supplied to a private stream (XDS signal) decoder 71.

Private stream decoder 71 decodes the XDS signal from the input private stream, and outputs it to an XDS signal convertor device 72. Where display 18 has a horizontal filter 82 and vertical filter 83, as in FIG. 2 and as explained above, there is no need for any processing by horizontal filter 61 and vertical filter 62 of optical disc playback device 50B. However, where the aspect ratio is altered by horizontal and vertical filters 61 and 62, XDS signal convertor device 72 alters the XDS signal in accordance with the aspect ratio of the output image from both filters in response to a command from control circuit 6, and outputs the converted result to XDS signal generator 73. XDS signal generator 73 generates an XDS signal according to the output from XDS signal convertor device 72, and outputs it to D/A convertor 17. D/A convertor 17 inserts the XDS signal from generator 73 in line 21 and line 284, and outputs it to display 18.

In this way, in the embodiment of FIG. 50 it is possible to perform processing in the same way as when the identification signal is situated in the PSM.

Moreover, by adapting signal generator 51 and D/A convertor 17 for use with CPX-1202, it is possible to generate CPX-1202 signals in the same way as in the playback device 50B described with reference to FIG. 50. Moreover, timing data indicating the times when these items of correction data are effective are recorded together with the correction data, and it can be arranged that they are transmitted to display 18 based on these timings. This timing data may be recorded for example as a PTS (Presentation Time Stamp) and a DTS (Decoding Time Stamp) defined by MPEG, and when using a PSM, by using an SCR (System Clock Reference) in the pack header placed immediately before the PSM.

In the above described embodiments, the multiplexed data is recorded in the recording medium, and it is arranged for this to be played back with a playback device 50, 50A or 50B, but it is of course possible to use the recording medium for transmission via a network for reception at remote destinations.

It will be appreciated that by multiplexing the digital image data and the correction data in accordance with the invention, as described above, it is possible to always view an image in the correct state.

It will be further appreciated that by recording digital image data and correction data on a recording medium after multiplexing in accordance with the invention, as described above, it is possible to provide a recording medium from which it is possible to continually display an image in the correct state.

Moreover, it will be appreciated that by controlling the display in accordance with correction data separated from the digital image data, in accordance with the invention, as described above, it is possible to continually display the image in the correct state.

Furthermore, it will be appreciated that by demultiplexing correction data from digital image data, generating a correction signal indicating the correction state for the aspect ratio of an image corresponding to the digital image data according to the separated correction data and superimposing such correction signal on the signal corresponding to the separated digital image data in accordance with the invention, as described above, it is possible to view the image in the correct state whether or not the image display device to which output is made has filters which can carry out vertical and horizontal processing.

Finally, it will be appreciated that an image data recording medium according to the invention, as described above, since it has recorded thereon correction data which has been multiplexed with the digital image data, makes it possible to continually view an image in the correct state.

Having described several preferred embodiments of the invention in detail, it is to be understood that the invention is not limited to those precise embodiments, and that a person skilled in the art could effect many changes and modifications therein without departing from the scope or spirit of the invention as defined in the appended claims.

What is claimed is:

1. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data indicative of the correction of the aspect ratio of said digital image data;
   means for combining the digital image data and said subtitle information data so as to generate combined digital image data;
   multiplexing means for multiplexing said combined digital image data and said digital audio data; and
   table of contents (TOC) adder means for adding said digital aspect ratio identification data and image display format data as TOC data to the multiplexed data.

2. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data indicative of the correction of the aspect ratio of said digital image data;
   means for combining the digital image data and said subtitle information data so as to generate combined digital image data;
   multiplexing means for multiplexing said combined digital image data and said digital audio data; and
   table of contents (TOC) adder means for adding said digital aspect ratio identification data and image display format data as TOC data to the multiplexed data;
   wherein said digital image data is compressed in accordance with the MPEG system so as to include intraframe-coded (I) pictures, interframe forward-predictive-coded (P) pictures and interframe bidirectionally-predictive-coded (B) pictures.

3. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data indicative of the correction of the aspect ratio of said digital image data;
   means for combining the digital image data and said subtitle information data so as to generate combined digital image data;
   multiplexing means for multiplexing said combined digital image data and said digital audio data; and
   table of contents (TOC) adder means for adding said digital aspect ratio identification data and image display format data as TOC data to the multiplexed data;
   wherein said digital image data is compressed in accordance with the MPEG system so as to have a user data region immediately prior to a sequence header.

4. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data indicative of the correction of the aspect ratio of said digital image data;
   means for combining the digital image data and said subtitle information data so as to generate combined digital image data;
   multiplexing means for multiplexing said combined digital image data and said digital audio data; and
   table of contents (TOC) adder means for adding said digital aspect ratio identification data and image display format data as TOC data to the multiplexed data;
   wherein said digital image data is compressed in accordance with the MPEG system so as to be comprised of groups of pictures each having an associated group-of-pictures header which is immediately preceded by a user data region.

5. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data indicative of the correction of the aspect ratio of said digital image data;
   means for combining the digital image data and said subtitle information data so as to generate combined digital image data;
   multiplexing means for multiplexing said combined digital image data and said digital audio data; and
   table of contents (TOC) adder means for adding said digital aspect ratio identification data and image display format data as TOC data to the multiplexed data;
   wherein said digital image data is compressed in accordance with the MPEG system so as to include successive pictures having a picture header preceded by a user data region.

6. An image data providing apparatus comprising:
   means for supplying digital image data which has been compressed in accordance with an MPEG system and which has been corrected for aspect ratio and for supplying digital audio data and subtitle data;
   means for generating subtitle information data in accordance with said subtitle data and for generating digital aspect ratio identification data. indicative of the correction of the aspect ratio of said digital image data;
   means for combining the digital image data and said subtitle information data so as to generate combined digital image data;

multiplexing means for multiplexing said combined digital image data and said digital audio data; and table of contents (TOC) adder means for adding said digital aspect ratio identification data and image display format data as TOC data to the multiplexed data;

wherein said identification data is data indicating that the mode in which said aspect ratio of the digital image data has been corrected is a squeeze mode or a letterbox mode.

7. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as table of contents (TOC) data to the multiplexed data.

8. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as table of contents (TOC) data to the multiplexed data;

wherein said digital image data is compressed in accordance with the MPEG system so as to include intraframe-coded (I) pictures, interframe forward-predictive-coded (P) pictures and interframe bidirectionally-predictive-coded (B) pictures.

9. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data;

adding said digital aspect ratio identification data and image display format data as table of contents (TOC) data to the multiplexed data;

wherein said digital image data is compressed in accordance with the MPEG system so as to have a user data region immediately prior to a sequence header.

10. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as table of contents (TOC) data to the multiplexed data;

wherein said digital image data is compressed in accordance with the MPEG system so as to be comprised of groups of pictures each having an associated group-of-pictures header which is immediately preceded by a user data region.

11. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as table of contents (TOC) data to the multiplexed data;

wherein said digital image data is compressed in accordance with the MPEG system so as to include successive pictures having a picture header preceded by a user data region.

12. An image data providing method comprising the steps of:

supplying digital image data which has been compressed in accordance with a MPEG system and corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as table of contents (TOC) data to the multiplexed data;

wherein said digital aspect ratio identification data is data indicating that the mode in which said aspect ratio of the digital image data has been corrected is a squeeze mode or a letterbox mode.

13. An image data recording apparatus comprising:

means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data;

table of contents (TOC) adder means for adding said digital aspect ratio identification data and image display format data as TOC data to the multiplexed data to form added data; and recording means for recording the added data on a recording medium.

14. An image data recording apparatus comprising:

means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data;

table of contents (TOC) adder means for adding said digital aspect ratio identification data and image display format data as TOC data to the multiplexed data to form added data; and recording means for recording the added data on a recording medium;

wherein said digital image data is compressed in accordance with the MPEG system so as to include intraframe-coded (I) pictures, interframe forward-predictive-coded (P) pictures and interframe bidirectionally-predictive-coded (B) pictures.

15. An image data recording apparatus comprising:

means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data;

table of contents (TOC) adder means for adding said digital aspect ratio identification data and image display format data as TOC data to the multiplexed data to form added data; and recording means for recording the added data on a recording medium;

wherein said digital image data is compressed in accordance with the MPEG system so as to have a user data region immediately prior to a sequencing header.

16. An image data recording apparatus comprising means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data;

table of contents (TOC) adder means for adding said digital aspect ratio identification data and image display format data as TOC data to the multiplexed data to form added data; and recording means for recording the added data on a recording medium;

wherein said digital image data is compressed in accordance with the MPEG system so as to be comprised of groups of pictures each having an associated group-of-pictures header which is immediately preceded by a user data region.

17. An image data recording apparatus comprising:

means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data;

table of contents (TOC) adder means for adding said digital aspect ratio identification data and image display format data as TOC data to the multiplexed data to form added data; and recording means for recording the added data on a recording medium;

wherein said digital image data is compressed in accordance with the MPEG system so as to include successive pictures having a picture header preceded by a user data region.

18. An image data recording apparatus comprising:

means for supplying digital image data which has been compressed in accordance with a MPEG system and corrected for aspect ratio and for supplying digital audio data and subtitle data;

means for generating subtitle information data in accordance with said subtitle data and for generating digital aspect ratio identification data indicative of the correction of the aspect ratio of said digital image data;

means for combining the digital image data and said subtitle information data so as to generate combined digital image data;

multiplexing means for multiplexing said combined digital image data and said digital audio data; and table of contents (TOC) adder means for adding said digital aspect ratio identification data and image display format data as TOC data to the multiplexed data to form added data; and recording means for recording the added data on a recording medium;

wherein said digital image data is compressed in accordance with the MPEG system.

19. An image data recording method comprising the steps of:

supplying digital image data which has been compressed in accordance with a MPEG system and which has been corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data; and adding said digital aspect ratio identification data and image display format data as TOC data to the multiplexed data to form added data; and recording said added data on a recording medium.

20. An image data recording method comprising the steps of:

supplying digital image data which has been compressed in accordance with a MPEG system and which has been corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data;

adding said digital aspect ratio identification data and image display format data as TOC data to the multiplexed data to form added data; and recording said added data on a recording medium;

wherein said digital image data is compressed in accordance with the MPEG system so as to include intraframe-coded (I) pictures, interframe forward-predictive-coded (P) pictures and interframe bidirectionally-predictive-coded (B) pictures.

21. An image data recording method comprising the steps of:

supplying digital image data which has been compressed in accordance with a MPEG system and which has been corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data;

adding said digital aspect ratio identification data and image display format data as TOC data to the multiplexed data to form added data; and recording said added data on a recording medium;

wherein said digital image data is compressed in accordance with the MPEG system so as to have a user data region immediately prior to a sequence header.

22. An image data recording method comprising the steps of:

supplying, digital image data which has been compressed in accordance with a MPEG system and which has been corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data;

adding said digital aspect ratio identification data and image display format data as TOC data to the multiplexed data to form added data; and recording said added data on a recording medium;

wherein said digital image data is compressed in accordance with the MPEG system so as to be comprised of groups of pictures each having an associated group-of-pictures header which is immediately preceded by a user data region.

23. An image data recording method comprising the steps of:

supplying digital image data which has been compressed in accordance with a MPEG system and which has been corrected for aspect ratio and supplying digital audio data and subtitle data;

generating subtitle information data in accordance with said subtitle data and generating digital aspect ratio identification data indicative of the correction of the aspect ratio of said digital image data;

combining the digital image data and said subtitle information data so as to generate combined digital image data;

multiplexing said combined digital image data and said digital audio data;

adding said digital aspect ratio identification data and image display format data as TOC data to the multiplexed data to form added data; and recording said added data on a recording medium;

wherein said digital image data is compressed in accordance with the MPEG system so as to include successive pictures having a picture header preceded by a user data region.

24. An image data recording method comprising the steps of:
supplying digital image data which has been compressed in accordance with a MPEG system and which has been corrected for aspect ratio and supplying digital audio data and subtitle data;
generating subtitle information data in accordance with said subtitle data and generating digital aspect ratio identification data indicative of the correction of the aspect ratio of said digital image data;
combining the digital image data and said subtitle information data so as to generate combined digital image data;
multiplexing said combined digital image data and said digital audio data;
adding said digital aspect ratio identification data and image display format data as TOC data to the multiplexed data to form added data; and
recording said added data on a recording medium;
wherein said identification data is data indicating that the mode in which said aspect ratio of the digital image data has been corrected is a squeeze mode or a letterbox mode.

25. An apparatus for controlling displaying of an image, comprising:
means for supplying added data having digital aspect ratio identification data as table of contents (TOC) data and multiplexed data containing combined digital image data formed by combining according to image display format data subtitle information data and digital image data which has been compressed in accordance with a MPEG system and which has been corrected for aspect ratio and digital audio data;
means for separating said digital image data, said subtitle information data, said digital audio data, and said digital aspect ratio identification data from said added data;
encoder means for encoding said digital image data separated from said added data to an analog video signal and for inserting aspect ratio identification data on a predetermined line of said analog video signal; and
means for controlling the aspect ratio of said image corresponding to the separated digital image data, as displayed by display means, in accordance with said digital aspect ratio identification data separated from said added data.

26. An apparatus for displaying an image according to claim 25, further comprising:
means for processing the separated digital image data in at least one of the horizontal and vertical directions of said display means; and wherein
said means for controlling controls said means for processing according to said digital aspect ratio identification data separated from said multiplexed data.

27. An image control method comprising the steps of:
supplying added data having digital aspect ratio identification data as table of contents (TOC) data and multiplexed data containing combined digital image data formed by combining according to image display format data subtitle information data and digital image data which has been compressed in accordance with a MPEG system and which has been corrected for aspect ratio and digital audio data;
separating said digital image data, said subtitle information data, said digital audio data, and said digital aspect ratio identification data from said added data;
encoding said digital image data separated from said added data to an analog video signal and inserting aspect ratio identification data on a predetermined line of said analog video signal; and
controlling the aspect ratio of said image corresponding to the separated digital image data, as displayed by display means, in accordance with said digital aspect ratio identification data separated from said added data.

28. An image display control method according to claim 27, further comprising:
processing the separated digital image data in at least one of the horizontal and vertical directions of the displayed image; and
wherein said controlling of the aspect ratio is effected by control of said processing in accordance with said digital aspect ratio identification data separated from said multiplexed data.

29. An apparatus for controlling displaying of an image, comprising:
means for supplying added data having digital aspect ratio identification data as table of contents (TOC) data and multiplexed data containing combined digital image data formed by combining according to image display format data subtitle information data and digital image data which has been compressed in accordance with a MPEG system and which has been corrected for aspect ratio and digital audio data;
means for separating said digital image data, said subtitle information data, said digital audio data, and said digital aspect ratio identification data from said added data;
means for converting said digital image data separated from said added data into an image signal;
encoder means supplied with said image signal for encoding an image corresponding to said image signal to an analog video signal and for inserting aspect ratio identification data on a predetermined line of said analog video signal;
means for generating a correction signal corresponding to said digital aspect ratio identification data separated from said added data; and
means for superimposing said correction signal on said image signal supplied to display means so that the latter correspondingly determines a desired aspect ratio of the displayed image.

30. An apparatus according to claim 29, further comprising:
means for processing the separated digital image data in at least one of the horizontal and vertical directions of said display means;
controlling means having different states for controlling said means for processing according to said digital aspect ratio indentification data separated from said multiplexed data; and
conversion means which converts said correction signal according to the state of control of said controlling means.

* * * * *